US011007487B2

(12) United States Patent
Kim et al.

(10) Patent No.: US 11,007,487 B2
(45) Date of Patent: May 18, 2021

(54) FABRICATION OF GREEN POLYMERIC MEMBRANES

(71) Applicant: King Abdullah University of Science and Technology, Thuwal (SA)

(72) Inventors: Dooli Kim, Thuwal (SA); Suzana Pereira Nunes, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 291 days.

(21) Appl. No.: 15/774,458

(22) PCT Filed: Dec. 8, 2016

(86) PCT No.: PCT/IB2016/057438
§ 371 (c)(1),
(2) Date: May 8, 2018

(87) PCT Pub. No.: WO2017/098433
PCT Pub. Date: Jun. 15, 2017

(65) Prior Publication Data
US 2020/0156011 A1 May 21, 2020

Related U.S. Application Data

(60) Provisional application No. 62/264,527, filed on Dec. 8, 2015, provisional application No. 62/346,711, filed on Jun. 7, 2016.

(51) Int. Cl.
| | | |
|---|---|---|
| *B01D 67/00* | (2006.01) | |
| *B01D 61/02* | (2006.01) | |
| *B01D 71/34* | (2006.01) | |
| *B01D 71/64* | (2006.01) | |
| *B01D 71/68* | (2006.01) | |
| *C08J 5/18* | (2006.01) | |
| *C08J 3/09* | (2006.01) | |
| *B29C 39/00* | (2006.01) | |
| *B29K 27/00* | (2006.01) | |
| *B29K 81/00* | (2006.01) | |

(52) U.S. Cl.
CPC ........ *B01D 67/0011* (2013.01); *B01D 61/027* (2013.01); *B01D 67/0016* (2013.01); *B01D 71/34* (2013.01); *B01D 71/64* (2013.01); *B01D 71/68* (2013.01); *C08J 3/096* (2013.01); *C08J 5/18* (2013.01); *B01D 2323/08* (2013.01); *B01D 2323/12* (2013.01); *B01D 2323/22* (2013.01); *B29C 39/003* (2013.01); *B29K 2027/16* (2013.01); *B29K 2081/06* (2013.01); *C08J 2327/16* (2013.01); *C08J 2381/06* (2013.01)

(58) Field of Classification Search
CPC ............ B01D 67/0011; B01D 67/0016; B01D 71/34; B01D 71/68; B01D 71/64; B01D 61/027; B01D 2323/08; B01D 2323/22; B01D 2323/12; C08J 5/18; C08J 3/096; C08J 2327/16; C08J 2381/06; B29K 2027/16; B29K 2081/06
USPC .......................................................... 521/25
See application file for complete search history.

(56) References Cited

PUBLICATIONS

Xing et al. "Fabrication of porous and interconnected PBI/p. 84 ultrafiltration membranes using [EMIM]OAc as the green solvent", Chemical Engineering Science, (2013), vol. 87, pp. 194-203. (Year: 2013).*
Zhao al. "Preparation of Porous Polysulfone Membranes Using Ionic Liquids with Different Alkyl Chain as Additives", Key Engineering Materials, 2012, vol. 501, pp. 330-334. (Year: 2012).*
Xing etal. "Fabrication of porous and interconnected PBI/P84 ultrafiltration membranes using [EMIMJOAc as the green solvent", Chemical Engineering Science, (2013), vol. 87, pp. 194-203. (Year: 2013).*
Kim et al. "Fabrication of polyacrylonitrile hollow fiber membranes from ionic liquid solutions", Polymer Chemistry, (2016), vol. 7, No. 1, pp. 113-124. (Year: 2016).*
Armand, et al., "Ionic-Liquid Materials for the Electrochemical Challenges of the Future", Nature Materials, vol. 8, Aug. 2009, pp. 621-629.
Bara, et al., "Effect of "Free" Cation Substituent on Gas Separation Performance of Polymer-Room-Temperature Ionic Liquid Composite Membranes", Industrial & Engineering Chemistry, vol. 48, No. 9, Apr. 8, 2009, pp. 4607-4610.
Bara, et al., "Improving CO2 Permeability in Polymerized Room-Temperature Ionic Liquid Gas Separation Membranes Through the Formation of a Solid Composite With a Room-Temperature Ionic Liquid", Polymers for Advanced Technologies, vol. 19, 2008, pp. 1415-1420.
Boussu, et al., "Study of the Characteristics and the Performance of Self-Made Nanoporous Polyethersulfone Membranes", Polymer 47, 2006, pp. 3464-3476.
Chaturvedi, et al., "Preparation, Characterization and Performance of Polyethersulfone Ultrafiltration Membranes", Desalination, vol. 133, 2001, pp. 31-40.
Dai, et al., "Combination of Ionic Liquids With Membrane Technology: a New Approach for Co2 Separation", Journal of Membrane Science, vol. 497, 2016, pp. 1-20.
Figoli, et al., "Towards Non-toxic Solvents for Membrane Preparation: A Review", Green Chemistry, vol. 16, 2014, pp. 4034-4059.
Gu, et al., "Synthesis and Gas Separation Performance of Triblock Copolymer Ion Gels with a Polymerized Ionic Liquid Mid-Block", Macromolecules, vol. 44, Mar. 14, 2011, pp. 1732-1736.
Idris, et al., "Synthesis, Characterization and Performance of Asymmetric Polyethersulfone (PES) Ultrafiltration Membranes With Polyethylene Glycol of Different Molecular Weights as Additives", Desalination, vol. 207, 2007, pp. 324-339.

(Continued)

*Primary Examiner* — Michael Bernshteyn
(74) *Attorney, Agent, or Firm* — Billion & Armitage

(57) ABSTRACT

Provided herein are methods of fabricating membranes using polymers with functionalized groups such as sulfone (e.g., PSf and PES), ether (e.g., PES), acrylonitrile (e.g., PAN), fluoride (e.g., pvdf and other fluoropolymers), and imide (e.g., extem) and ionic liquids. Also provided are membranes made by the provided methods.

15 Claims, 24 Drawing Sheets

(56) References Cited

PUBLICATIONS

Irfan, et al., "Surface Modification and Performance Enhancement of Nano-Hybrid f-MWCNT/PVP90/PES Hemodialysis Membranes", Journal of Membrane Science, vol. 467, 2014, pp. 73-84.
Jalal, et al., "Reactive Phase Inversion for Manufacture of Asymmetric Poly (Ether Imide Sulfone) Membranes", Reactive and Functional Polymers, vol. 85, Dec. 2014, pp. 1-10.
Jiang, "SO2 Gas Separation Using Supported Ionic Liquid Membranes", The Journal of Physical Chemistry B, vol. 111, No. 19, Apr. 19, 2007, pp. 5058-5061.
Kim, et al., "Fabrication of Polyacrylonitrile Hollow Fiber Membranes From Ionic Liquid Solutions", Polymer Chemistry, vol. 7, Oct. 8, 2015, pp. 113-124.
Kok, et al., "Relationship between the Hydrodynamic Radius and the Radius of Gyration of a Polymer in Solution", Die Makromolekulare Chemie Rapid Communications, vol. 2, 1981, pp. 655-659.
Le, et al., "Materials and Membrane Technologies for Water and Energy Sustainability", Sustainable Materials and Technologies, vol. 7, 2016, pp. 1-28.
Livazovic, et al., "Cellulose Multilayer Membranes Manufacture With Ionic Liquid", Journal of Membrane Science, vol. 490, 2015, pp. 282-293.
Madhavan, et al., "Ionic Liquids as Self-Assembly Guide for the Formation of Nanostructured Block Copolymer Membranes", Journal of Membrane Science, vol. 492, 2015, pp. 568-577.
Noble, et al., "Perspective on Ionic Liquids and Ionic Liquid Membranes", Journal of Membrane Science, vol. 369, 2011, pp. 1-4.
Nunes, "Block Copolymer Membranes for Aqueous Solution Applications", Macromolecules, vol. 49, No. 8, 2016, pp. 2905-2916.
Nunes, et al., "Evidence for Spinodal Decomposition and Nucleation and Growth Mechanisms During Membrane Formation", Journal of Membrane Science, vol. 111, 1996, pp. 93-103.
Nunes, et al., "Membrane Technology: in the Chemical Industry, 2nd, Revised and Enlarged Edition", John Wiley & Sons, ISBN: 978-3-527-60859-1, 2006, 358 Pages.
Peinemann, et al., "Membranes for Food Applications", Membrane Technology, vol. 3, 2010, 265 pages.
Peinemann, et al., "Membranes for the Life Sciences", vol. 1, John Wiley & Sons, 2008, 340 pages.
Peng, et al., "Evolution of Ultra-Thin Dense-Selective Layer From Single-Layer to Dual-Layer Hollow Fibers Using Novel Extem® Polyetherimide for Gas Separation", Journal of Membrane Science, vol. 360, 2010, pp. 48-57.
Perkins, et al., "Probability-Based Protein Identification by Searching Sequence Databases Using Mass Spectrometry Data", Electrophoresis, vol. 20, 1999, pp. 3551-3567.
Pesek, et al., "Aqueous Quenched Asymmetric Polysulfone Membranes Prepared by Dry/Wet Phase Separation", Journal of Membrane Science, vol. 81, 1993, pp. 71-88.
Pham, et al., "Environmental Fate and Toxicity of Ionic Liquids: A Review", Water Research, vol. 44, 2010, pp. 352-372.
Pinnau, et al., "Influence of Quench Medium on the Structures and Gas Permeation Properties of Polysulfone Membranes Made by Wet and Dry/wet Phase Inversion", Journal of Membrane Science, vol. 71, 1992, pp. 81-96.
Rahimpour, et al., "Nano-Porous Polyethersulfone (PES) Membranes Modified by Acrylic Acid (AA) and 2-Hydroxyethylmethacrylate (HEMA) as Additives in the Gelation Media", Journal of Membrane Science, vol. 364, 2010, pp. 380-388.
Razali, et al., "Sustainable Wastewater Treatment and Recycling in Membrane Manufacturing", Green Chemistry, vol. 17, Sep. 10, 2015, pp. 5196-5205.
Rogers, et al., "Ionic Liquids-Solvents of the Future?", Science, vol. 302, Oct. 31, 2003, pp. 792-793.
Santos, et al., "Acetate Based Supported Ionic Liquid Membranes (SILMs) for CO2 Separation: Influence of the Temperature", Journal of Membrane Science, vol. 452, 2014, pp. 277-283.
Searle, "Scaffold: A Bioinformatic Tool for Validating MS/MS-Based Proteomic Studies", Proteomics, 10, 2010, pp. 1265-1269.
Shannon, et al., "Science and Technology for Water Purification in the Coming Decades", Nature, vol. 452, Mar. 20, 2008, pp. 301-310.
Singh, et al., "Membrane Characterization by Solute Transport and Atomic Force Microscopy", Journal of Membrane Science, vol. 142, 1998, pp. 111-127.
Szekely, et al., "Sustainability Assessment of Organic Solvent Nanofiltration: From Fabrication to Application", Green Chemistry, vol. 16, Jul. 10, 2014, pp. 4440-4473.
Toh, et al., "Polymeric Membranes for Nanofiltration in Polar Aprotic Solvents", Journal of Membrane Science, vol. 301, 2007, pp. 3-10.
Xia, et al., "Structural Determination of Extern XH 1015 and Its Gas Permeability Comparison with Polysulfone and Ultem via Molecular Simulation", Industrial and Engineering Chemistry Research, vol. 49, No. 23, 2010, pp. 12014-12021.
Xing, et al., "Fabrication of Porous and Interconnected PBI/P84 Ultrafiltration Membranes using [EMIM]OAc as the Green Solvent", Chemical Engineering Science, vol. 87, 2013, pp. 194-203.
Xing, et al., "Formation of Cellulose Acetate Membranes via Phase Inversion Using Ionic Liquid, [BMIM]SCN, As the Solvent", Industrial & Engineering Chemistry Research, vol. 49, No. 18, 2010, pp. 8761-8769.
Xing, et al., "Investigation of Unique Interactions Between Cellulose Acetate and Ionic Liquid [EMIM]SCN, and Their Influences on Hollow Fiber Ultrafiltration Membranes", Journal of Membrane Science, vol. 380, 2011, pp. 87-97.
Xing, et al., "The Ionic Liquid [EMIM]OAc as a Solvent to Fabricate Stable Polybenzimidazole Membranes for Organic Solvent Nanofiltration", Green Chemistry, vol. 16, 2014, pp. 1383-1392.
Xu, et al., "Effect of Polyethylene Glycol Molecular Weights and Concentrations on Polyethersulfone Hollow Fiber Ultrafiltration Membranes", Journal of Applied Polymer Science, vol. 91, 2004, pp. 3398-3407.
Zhang, et al., "Life Cycle Assessment of an Ionic Liquid versus Molecular Solvents and Their Applications", Environmental Science Technology, vol. 42, No. 5, 2008, pp. 1724-1730.
Ya Mei Zhao et al: "Preparation of Porous Polysulfone Membranes Using Ionic Liquids with Different Alkyl Chain as Additives", Key Engineering Materials, vol. 501, Jan. 24, 2012 (Jan. 24, 2012), pp. 330-334.
Ding Yu Xing et al: "Fabrication of porous and interconnected PBI/P84 ultrafiltration membranes using (EMIM]OAc as the green solvent", Chemical Engineering Science, vol. 87, Jan. 1, 2013 (Jan. 1, 2013), pp. 194-203.
Dooli Kim et al: "Fabrication of polyacrylonitrile hollow fiber membranes from ionic liquid solutions", Polymer Chemistry, vol. 7, No. 1, Jan. 1, 2016 (Jan. 1, 2016), pp. 113-124.
Ding Yu Xing et al: "Investigation of unique interactions between cellulose acetate and ionic liquid (EMIM]SCN, and their influences on hollow fiber ultrafiltration membranes", Journal of Membrane Science, Elsevier BV, NL, vol. 380, No. 1, Jun. 22, 2011 (Jun. 22, 2011), pp. 87-97.
Bijan! S et al: "Physical-chemical and electrical characterizations of membranes modified with room temperature ionic liquids: Age effect", Vacuum, Pergamon Press, GB, vol. 83, No. 10, Jun. 16, 2009 (Jun. 16, 2009), pp. 1283-1286.
PCT/IB2016/057438—ISR and Written Opinion, dated Feb. 16, 2017.

* cited by examiner polyethersulfone

1-Ethyl-3-methylimidazolium diethyl phosphate [EMIM]DEP

Polyvinylidene fluoride (PVDF)

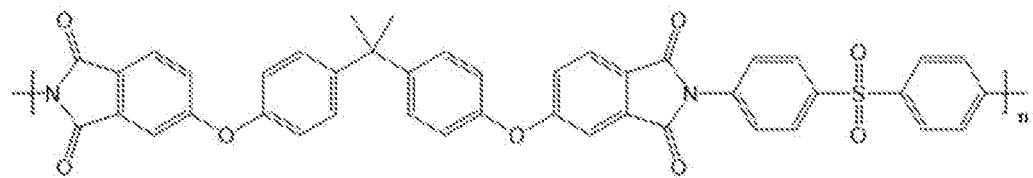
FIG. 21A
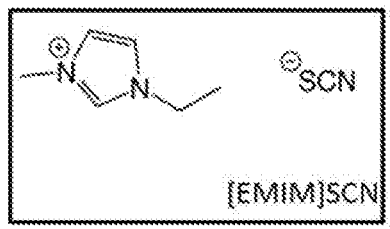 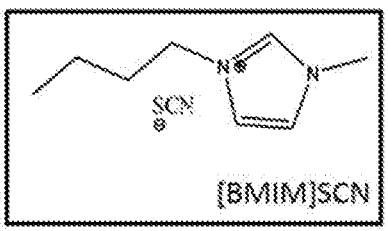 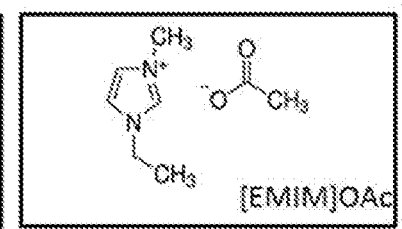
FIG. 21B    FIG. 21C    FIG. 21D
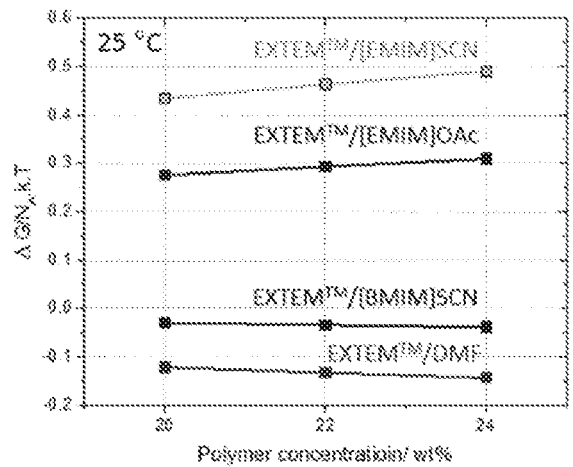 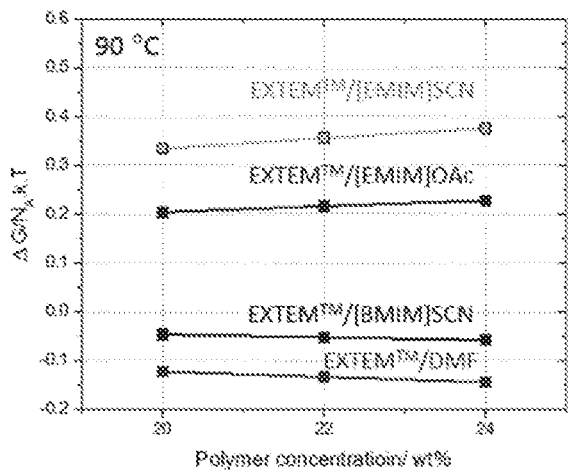
FIG. 22A    FIG. 22B

FABRICATION OF GREEN POLYMERIC MEMBRANES

CROSS-REFERENCE TO RELATED APPLICATIONS

This application is the National Stage of International Application No. PCT/IB2016/057438, filed Dec. 8, 2016, which claims the benefit of and priority to U.S. Provisional Application Nos. 62/264,527, filed Dec. 8, 2015 and 62/346,711, filed Jun. 7, 2016, both of which are incorporated herein by reference in their entirety.

BACKGROUND OF THE INVENTION

The European Chemicals Agency (EACH), which is governed by EU public law, classified harmful or toxic solvents into a list regulated by the Registration, Evaluation, Authorization and Restriction of Chemicals (REACH). In this list, chemicals which are commonly used to fabricate membranes such as dimethylformamide (DMF), N-methyl-2-pyrrolidone (NMP), and dimethyl adipimidate (DMA), appeared as toxic compounds. This means that commonly used solvents may soon be withdrawn from the market and will not be able to be utilized in Europe due to their high toxicity and risk for human health and the environment.

BRIEF SUMMARY OF THE INVENTION

Provided herein are methods of fabricating membranes using polymers with functionalized groups such as sulfone (e.g., PSf and PES), ether (e.g., PES), acrylonitrile (e.g., PAN), fluoride (e.g., pvdf and other fluoropolymers), and imide (e.g., extem) or any combination thereof and ionic liquids. Also provided are membranes made by the provided methods.

BRIEF DESCRIPTION OF THE DRAWINGS

FIG. 21A is a schematic of the polymer EXTEM™ (SABIC, Riyadh, Saudi, Arabia). FIG. 21B is a schematic of the chemical structure of 1-ethyl-3-methylimidazolium thiocyanate [EMIM]SCN. FIG. 21C is a schematic of the chemical structure of 1-butyl-3-methylimidazolium thiocyanate [BMIM]SCN. FIG. 21D is a schematic of the chemical strucutre of 1-ethyl-3-methylimidazolium acetate [EMIM]OAc.

FIGS. 22A and 22B are graphs showing the estimation of Gibbs free energy of mixing EXTEM™ polymer solutions with different ionic liquids at 25° C. (FIG. 22A) and 90° C. (FIG. 22B).

DETAILED DESCRIPTION OF THE INVENTION

Figure 1:
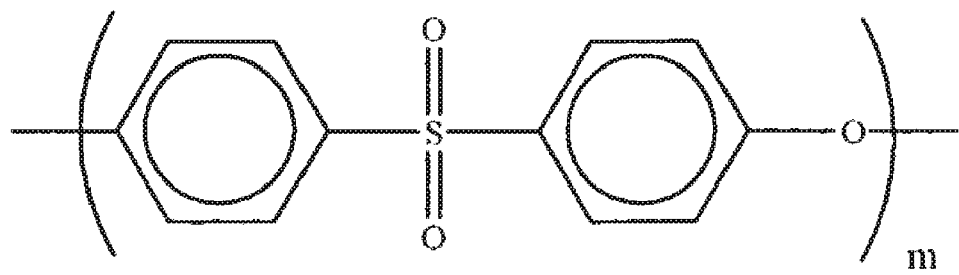
FIG. 1 is a schematic showing the structure of an exemplary polymer, polyethersulfone (PES).
Figure 2:
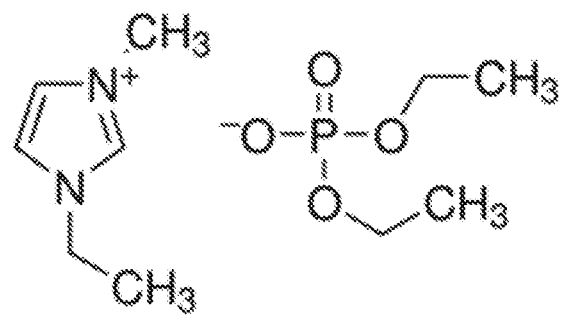
FIG. 2 is a schematic showing the structure of an exemplary ionic liquid, 1-ethyl-3-methylimidazolium diethyl phosphate ([EMIM]DEP).
Figure 3:
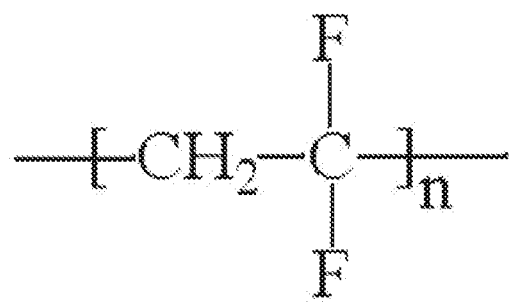
FIG. 3 is a schematic showing the structure of an exemplary fluoropolymer, polyvinylidene fluoride (PVDF).

Alternatives to conventional chemical solvents are needed to replace conventional chemical solvents. Replacements need to be sustainable and less toxic to the environment and human health; such acceptable solvents are frequently referred to as "green" solvents. Ionic liquids (IL) are considered green solvents in many aspects, such as lack of measurable vapor pressure, non-flammability, reusability, high thermal stability and low corrosiveness. Thus, ionic liquids are not volatile and are less toxic than most organic solvents used for membrane manufacture. Due to their high solubility in water, toxicity to aquatic organisms has been a matter of some concern, but the substitution of hazardous volatile organic solvents frequently used for membrane fabrication by less toxic mixtures containing ionic liquids could be very beneficial as they generally do not lead to hazardous volatile organic compound (VOC) generation in contrast to common organic solvents.

There are few studies about fabrication of membranes with ionic liquids. The main problem is the low polymer solubility in pure ionic liquids. Since most membrane manufacture processes are based on solution casting or fiber spinning, it is very difficult to fabricate membranes from solutions in ionic liquids. However, provided herein is a combination of ionic liquids and polymers that can be mixed completely and used for membrane fabrication.

Provided herein is a method of making a membrane comprising using ionic liquids. The method includes preparing a membrane solution comprising an ionic liquid and a polymer. The polymer is selected from the group consisting of a polymer with one or more functionalized group such as sulfone (e.g., PSf and PES), ether (e.g., PES), acrylonitrile (e.g., PAN), fluoride (e.g., pvdf or other fluoropolymers), and imide (extem) or any combination thereof. Optionally the polymer is an aromatic polymer. Optionally, the solution comprises one or more polymers with a functionalized group. Optionally, the solution comprises a combination of one or more polymers with functionalized groups, such as sulfone (PSf and PES), ether (PES), acrylonitrile (PAN), fluoride (pvdf or other fluoropolymers), and imide (exterm). Optionally, the polymer is completely dissolved in the membrane solution. The solution is then subjected to suitable conditions for forming the membrane Optionally, the formed membrane does not retain any of the ionic liquid. Optionally, the formed membrane retains less than 10%, 9%, 8%. 7%, 6%. 5%, 4%, 3%, 2%, 1%, 0.05%, 0.025%, or less than 0.01% of the ionic liquid.

As discussed above, the provided methods utilize membranes with minimal defects and less toxic materials, as compared to methods of preparing membranes with conventional solvents. Specifically, as shown in the examples, the membranes prepared using ionic liquids according to the present methods result in membranes that lack macrovoids. As used herein, "macrovoid" refers to voids or holes in the continuous phase polymer within the mixed matrix membrane. In contrast, membranes prepared using NMP, DMAc, and DMF resulted in the appearance of macrovoids. Further, the provided methods result in preparation of membranes with more uniform pore sizes than membranes prepared with conventional organic solvents. The provided methods result in preparation of membranes that can discriminate between a wider range of sizes than membranes prepared with conventional solvents. See Table 1 in Example 1. Thus, the provided methods can be used to prepare membranes that reject molecules of 300 Mw or greater, 1,500 Mw or greater, 6,000 Mw or greater, 10,000 Mw or greater or 35,000 Mw or greater.

There are a variety of ways to fabricate membranes including TIPS (thermal induced phase separation), VIPS (Vapor induced phase separation), and NIPS (non-solvent induced phase separation). The methods disclosed herein thus optionally include methods of membrane fabrication selected from the group consisting of TIPS, VIPS and NIPS. The TIPS method of fabricating membranes uses temperature differences to induce phase separation of polymer solution from a liquid state containing the polymer and the solvents into a solid state. Briefly, a polymer solution is prepared and raised to a high temperature. The polymer solution is solidified by cooling the temperature rapidly to bring about phase separation. Typically, the polymer solution is prepared by melting the polymer at a high temperature with solvents. The solvent can be a low volatility solvent like ionic liquids. Thus, the polymer is melted in an ionic liquid. Optionally, the provided methods can include increasing the temperature of the membrane solution to a first temperature and rapidly reducing the first temperature of the membrane solution to a second temperature to form the membrane. Optionally, the first temperature is from 60° C. to 300° C. or any temperature between 60° C. to 300° C. inclusive. Optionally, the second temperature is from –80° C. to 60° C. or any temperature between –80° C. to 60° C. inclusive.

The NIPS method of fabricating membranes uses non-solvents or poor solvents to bring about phase separation of the polymer solution. Briefly, prepared polymer solutions containing the polymer and one or more solvents are solidified by exchanging the solvents in the polymer solutions with a non-solvent. Optionally, the exchange occurs in a coagulant container in the presence of a coagulation solution containing the non-solvent. Depending on the rate of exchange between solvents and the non-solvent, the structure of the membranes and the sizes of pores differ. Thus, suitable conditions for forming the membrane can include contacting the membrane solution with a coagulation solution to exchange the ionic liquid with a non-solvent to form the membrane. The poor solvents, or alternatively called non-solvents, include, but are not limited to, low molecular weight polyols such as glycerin, ethylene glycol, butanediol and propylene glycol, low molecular weight alcohols such as methanol, ethanol, butanol and isopropanol, and the like, or water. The non-solvents can be used alone or in combination. Thus, optionally, the coagulation solution comprises glycerin, ethylene glycol, butanediol, propylene glycol, methanol, ethanol, butanol, isopropanol, water, or a combination thereof.

Optionally, the methods for membrane fabrication include, but are not limited to, can be TIPS, NIPS, VISP, and the like.

An ionic liquid (IL) is a salt in the liquid state. Any salt that melts without decomposing or vaporizing usually yields an ionic liquid. Optionally, the term ionic liquid refers to a liquid composed entirely of ions that is fluid at a temperature below 100° C. Optionally, the ionic liquid is liquid at or below room temperature. Ionic liquids comprise a cation and an anion. Optionally, the cation or anion, or cation and anion may be based on imidazolium, pyridium, or ammonium. Optionally, the cation of the ionic liquid has multiple aliphatic or isomerism material as a side chain on a cyclic compound as a material based on imidazolium and pyridium, or multiple aliphatic or isomerism material as a side chain on nitrogen group as a material based on ammonium. In some embodiments, the cation of the ionic liquid has the following formula:

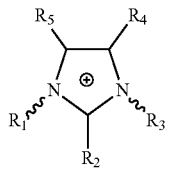

wherein $R_1$, $R_2$, $R_3$, $R_4$, and $R_5$ are each independently selected from the group consisting of hydrogen, halogen, hydroxyl, nitro, cyano, trifluoromethyl, substituted or unsubstituted amino, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkyl, substituted or unsubstituted cycloalkenyl, substituted or unsubstituted cycloalkynyl, substituted or unsubstituted aryl, substituted or unsubstituted heteroaryl, substituted or unsubstituted carbonyl, substituted or unsubstituted carboxyl, substituted or unsubstituted thio, and substituted or unsubstituted sulfonyl.

The ionic liquid includes one or more anions, including, but not limited to, [Cl], [Br], [I], [HSO$_4$], [NO$_3$], [SO$_4$], [CF$_3$SO$_3$], [(C$_2$F$_5$)PF$_3$], [N(SO$_2$CF$_2$)$_2$], [CF$_3$SO$_3$], [B(CN)$_4$], [N(CN)$_4$], [C(CN)$_4$], [SCN], [HSO$_4$], [CH$_3$SO$_4$], [C$_2$H$_5$SO$_4$], [C$_4$H$_9$SO$_4$], [C$_5$H$_{11}$O$_2$SO$_4$], [B(C$_2$O$_4$)$_2$], [CH$_3$SO$_3$], [CF$_3$CO$_2$], [CF$_3$SO$_3$], [CH$_3$C$_6$H$_4$SO$_3$], [(CF$_3$SO$_2$)$_2$N], [BF$_4$], [PF$_6$], [C$_4$F$_9$SO$_3$], [(CF$_3$SO$_3$)$_2$N], [Tf$_2$N], [PF$_6$], [Ac] and [PO$_4$]. In some embodiments, when the cation is 1-butyl-3-methylimidazolitun, the anion is not thiocyanate. In some embodiments, when the cation is 1-ethyl-3-methylimidazolium, the anion is not acetate.

Suitable ionic liquids include, but are not limited to, 1-ethyl-3-methylimidazolium (EMIM) chloride, EMIM dicyanamide, 1-butyl-3,5-dimethylpyridinium bromide, 1-ethyl-3-methylimidazolium diethyl phosphate ([EMIM] DEP), 1-butyl-3-methylimidazolium chloride, 1-alkyl-3-methylimidazolium, 1-alkylpyridinium, 1-alkylpyridinium chloride, and N-methyl-N-alkylpyrrolidinium. In some embodiments, the ionic liquid is not 1-butyl-3-methylimidazolium thiocyanate. In some embodiments, the ionic liquid is not 1-ethyl-3-methylimidazolium acetate.

Polymers suitable for use in the provided methods include, but are not limited to, polymers containing a sulfone group, a polymer containing an ether group or a polymer containing a fluorinated group.

A fluoropolymer or polymers containing a fluorinated group as used herein refer to a fluorocarbon-based polymer. The terms fluoropolymer and polymer containing a fluorinated group are used herein interchangeably. Suitable fluoropolymers include, but are not limited to, polyvinylidene fluoride-hexafluoropropyl copolymer (PVDF-HFP), polyvinylidene fluoride (PVDF), polyvinylfluoride (PVF), polychlorotrifluoroethylene (PCTFE), perfluoroalkoxy polymer (PFA), fluorinated ethylene-propylene (FEP), polyethylenetetrafluoroethylene (ETFE), polyethylenechlorotrifluoroethylene (ECTFE), perfluorinated elastomer [perfluoroelastomer] (FFPM/FFKM), fluorocarbon [chlorotrifluoroethylenevinylidene fluoride] (FPM/FKM), fluoroelastomer [tetrafluoroethylene-propylene] (FEPM), perfluoropolyether (PFPE), perfluorosulfonic acid (PFSA), perfluoropolyoxetane, and polyterafluoroethylene (PTFE).

Suitable polymers include, but are not limited to, EXTEM™ (SABIC, Riyadh, Saudi Arabia) polysulfone, polyether sulfone (PES), polycarbonate, polyphenylene sulfide, polystyrene, aromatic polycarbonates, aromatic polyesters, aromatic polyamides, polyphenylenes, polyxylylenes, polyphenylenevinylenes, polyphenyleneethylenes, polyaryl ether ketones, and aromatic polyimides. In some embodiments, when the polymer is EXTEM™ XH1005, the ionic liquid is not 1-butyl-3-methylimidazolium thiocyanate. In some embodiments, when the polymer is EXTEM™ XH1005, the ionic liquid is not 1-ethyl-3-methylimidazolium acetate.

The membrane solution can include by weight percent 0.1 to 60% of one or more polymers. Optionally, the membrane solution comprises 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 weight percent of one or more polymers. Optionally, the solution comprises 10 to 60 weight percent of one or more polymers. Optionally, the solution comprises 10 to 40 weight percent of one or more polymers. The polymer can comprise a polymer with a functionalized group such as sulfone (PSf and PES), ether(PES), acrylonitrile(PAN), fluoride(pvdf), and imide(extem) or any combination thereof. The polymer can comprise a fluoropolymer, a combination of fluoropolymners, or a combination of a fluoropolymer and a polymer with functionalized groups such as sulfone (e.g., PSf and PES), ether (e.g., PES), acrylonitrile (e.g., PAN), or imide (e.g., extem).

As described herein, the membrane solution also comprises an ionic liquid. Optionally, the solution comprises 40 to 99.9 weight percent of the ionic liquid or any value between 40 to 99.9 weight percent. Optionally, the solution comprises 40, 41, 42, 43, 44, 45, 46, 47, 48, 49, 50, 51, 52, 53, 54, 55, 56, 57, 58, 59, 60, 61, 62, 63, 64,65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.9 weight percent of the ionic liquid.

Optionally, the membrane solution comprises only polymer and ionic liquid. Thus, optionally, the membrane solution comprises only one or more polymers and one or more ionic liquids.

Optionally, the provided membrane solutions further include one or more additives. Suitable additives include, but are not limited to, metal compounds, inorganic acids, organic acids, solvents, and water-soluble organic solvents. Metal compounds include, for example, LiCl or LiClO$_4$. Inorganic acids include, for example, acetic acid or phosphoric acid. Organic acids include, for example, propionic acid. Optionally, the additive is ethanol. Optionally, the additive is a water-soluble organic solvent such as acetone, glycerol, ethylene glycol or water.

Optionally, the membrane solution comprises one or more additional polymers, for example, polyethylene, polypropylene, polyvinylalcohol, cellulose acetate, and polyacrylonitrile.

Optionally, the additive is a pore-forming agent. Pore forming agents include, but are not limited to, polyvinyl pyrrolidone (PVP), polyethylene glycol (PEG), methyl cellulose, carboxy methyl cellulose, polyvinyl alcohol, polyacrylic acid, polyacrylate and its esters. Optionally, the pore-forming agent is an inorganic pore-forming agent, for example, hydrochloric acid, sulfuric acid, phosphoric acid, sodium hydroxide, potassium hydroxide, and calcium hydroxide. Pore forming agents can be used alone or in combination.

Optionally, the additive is a surfactant. Surfactants include, but are not limited to, anionic surfactants, cationic surfactants, amphoteric surfactants or non-ionic surfactants. Optionally, the surfactant is selected from the group consisting of Tween-80, sodium dodecyl sulfate, sodium dodecylbenzene sulfonate, dodecyl benzyl ammonium chloride, cetyl trimethyl ammonium bromide, or a combination thereof. Surfactants can be used alone or in combination.

The provided methods can be used to create a variety of membranes. For example, the membrane can be a microfiltration membrane (MF), ultrafiltration membrane (UF), nanofiltration membrane (NF), reverse osmosis membrane (RO), forward osmosis membrane (FO), pervaporation membrane, gas separation membrane, electrodialysis membrane, dialysis membrane, or a distillation membrane. Optionally, the membranes can be symmetric, asymmetric, non-porous, porous or a dense membrane. Optionally, depending on added layers on a substrate membrane and methods for adding layers, the membrane can be a multi-layered, a composite membrane, or a thin film composite membrane. Optionally, depending on the size of pores, the membrane can be a microfiltration membrane (MF), ultrafiltration membrane (UF), nanofiltration membrane (NF) (with or without interfacial polymerization layer), reverse osmosis membrane (RO) (with interfacial polymerization layer), and forward osmosis membrane (FO) (with interfacial polymerization layer).

In summary, an ionic liquid was identified that was able to completely dissolve PES. The PES/[EMIM]DEP system, as described herein, can be used for membrane manufacture by solution casting and immersion in water. The new process is fully absent of volatile solvents and therefore constitutes a new route for PES membrane manufacture. The process is environmentally friendly and healthier than classical membrane manufactures currently implemented in the industry, as long as a further step of ionic liquid recovery from the water bath could be provided. The proposed casting solution uses only chemicals accepted as non-hazardous. The method guarantees the continuity of production of PES membranes even if future environmental policies would ban the currently used solvents, such as NMP, DMF, and DMAc, from industrial production.

The thermodynamic conditions and the kinetics of phase separation for the new system was evaluated. $\Delta G_m$ is positive, when estimated taking into account solubility parameters, but low enough to promote a homogeneous solution, while higher values were calculated for PSU/[EMIM]DEP. The viscosity and G' are higher than for PES solutions in NMP, DMF and DMAc. The values are highly dependent of concentration in the range of 8 to 16 wt %, which is relevant for membrane fabrication. Nanoporous sponge-like membranes with unusually fine structure were obtained. By controlling the polymer concentration, membranes with MWCO's of 30, 5, 1.3, and 1,250 g mol$^{-1}$ are obtained with high water permeance. The membranes are, optionally, applied in the separation of a peptide mixture with molecular weights in the range of 800 to 3,500 g mol$^{-1}$, which could be effectively separated. Now concerning recycling, the ionic liquid could be recovered from the membrane fabrication bath, by simple steps, based on evaporation. The new manufacturing process is not only environmentally advantageous, but leads to PES membranes with performance characteristics that were previously not available.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein. For example, if a method is disclosed and discussed and a number of modifications that can be made to a number of molecules including the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the material for which they are cited are hereby specifically incorporated by reference in their entireties.

A number of embodiments have been described. Nevertheless, it will be understood that various modifications may be made. Accordingly, other embodiments are within the scope of the claims.

EXAMPLES

Example 1

Membrane Fabrication Using a Polymer with a Functionalized Group and Ionic Liquid Four polymer solutions were prepared (1) with the composition 8% PES/92% [EMIM]DEP, (2) with the composition 12% PES/88% [EMIM]DEP, (3) with the composition 14% PES/86% [EMIM]DEP, and (4) with the composition 16% PES/84% [EMIM]DEP, each at 90° C. The polymer solution was then cast on a glass plate at room temperature and immersed in water to separate the phase of this polymer solution by exchanging solvent in the polymer solution to a non-solvent, water.

Three polymer solutions were prepared (1) with the composition 16% PES/84% NMP, (2) with the composition (16% PES/84% DMF, and (3) with the composition 16% PES/84% DMAc, each at 90° C. The polymer solution was then cast on a glass plate at room temperature and immersed in water to separate the phase of this polymer solution by exchanging solvent in the polymer solution to a non-solvent, water.

Figure 4:
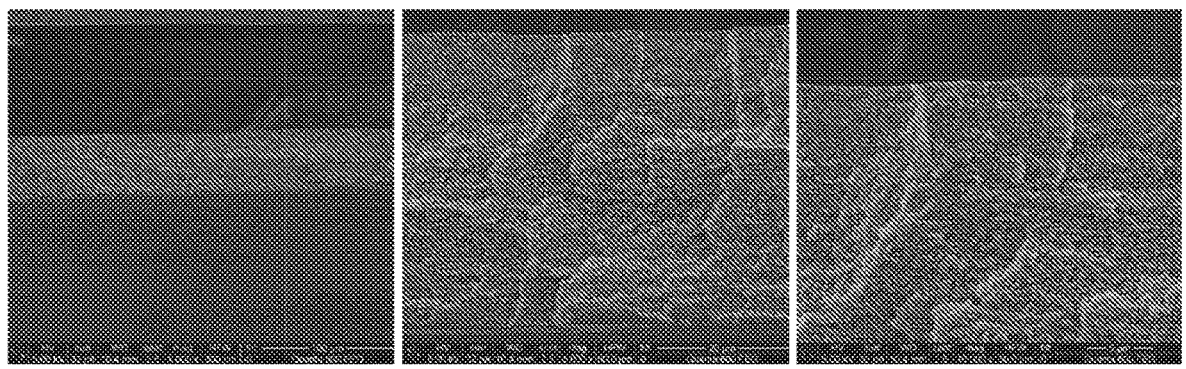
FIG. 4 shows microscopy images of a membrane comprising 12% PES and 88% ([EMIM]DEP at different levels of magnification, 1000× (left panel), 5000× (middle panel) and 10,000× (right panel). The membrane was 50 µm thick.
Figure 5A:
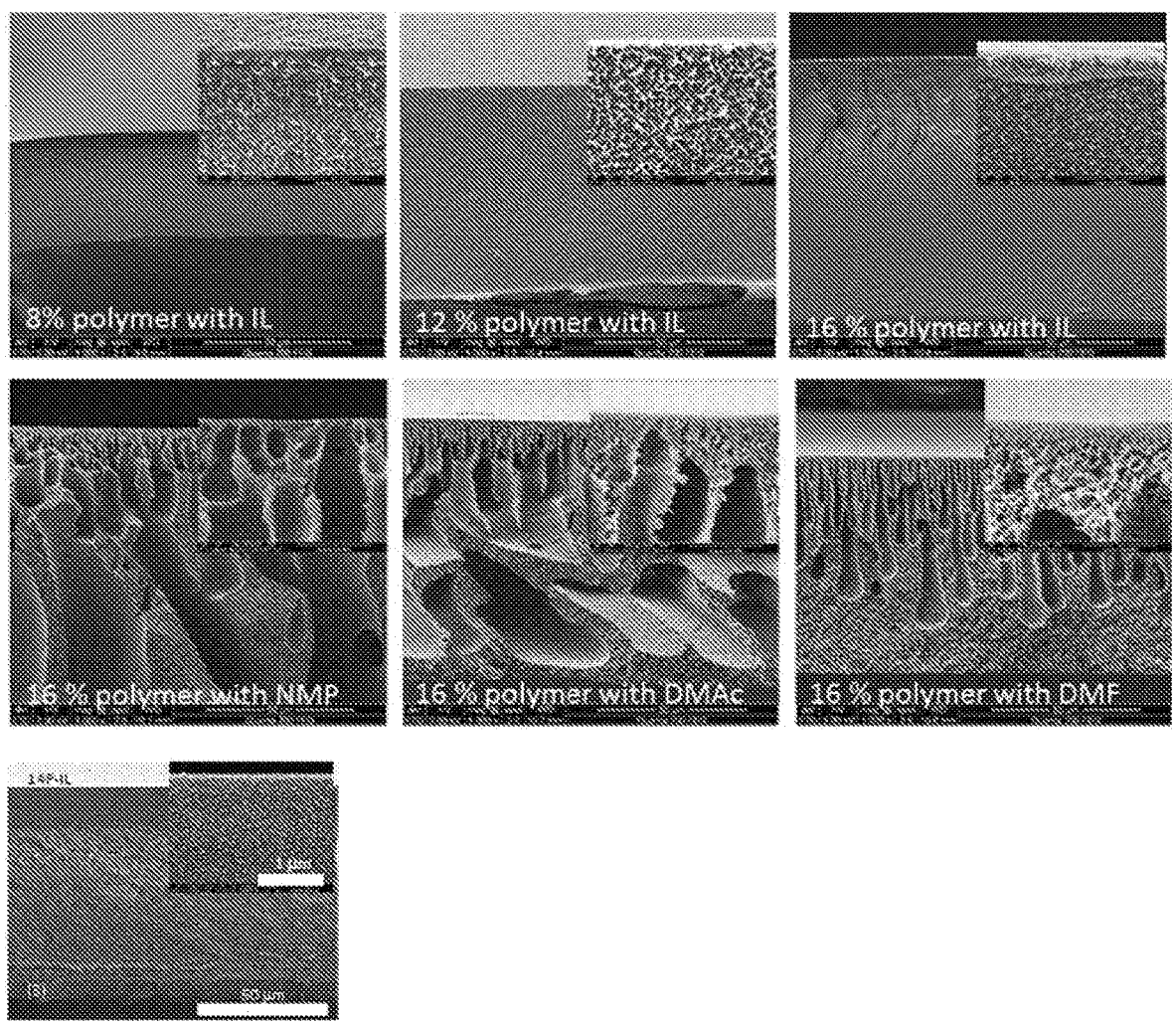
FIG. 5A are microscopic images showing the cross-section morphologies of membranes comprising PES and [EMIM]DEP and membranes comprising PES and N-methyl-2-pyrrolidone (NMP), Dimethylacetamide (DMAc), or dimethylformamide (DMF). The membranes containing 8%, 12%, 14%, or 16% polymer prepared with the ionic liquid ([EMIM]DEP) have porous structures with very small size pores and lack macrovoids as compared to the membranes prepared with NMP, DMAc or DMF.
Figure 5B:
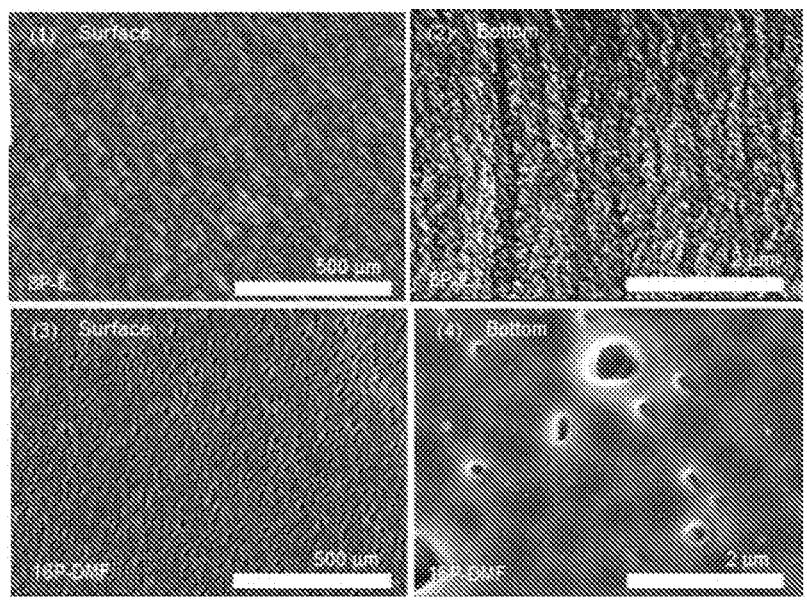
FIG. 5B are microscopic images showing the structure of the surface and the bottom of 8% PES/[EMIM]DEP membranes (top images (1) and (2)) and 16% PES/DMF membranes (bottom images (3) and (4)).

The results are shown in FIGS. 4 and 5, which show the cross-sectional morphologies of the membranes. As seen in FIG. 5, the membranes made from 8%; 12%; 14% and 16% PES polymer with the ionic liquid had porous structures with very small size pores. As the concentration of the polymer increased, the thickness of the membranes increased. In the case of the controls, i.e., the membranes with solvents commonly used for membrane fabrication (NMP, DMF, and DMAc), these membranes had porous structures but also had macrovoids, which cause weaker mechanical properties of membranes. Thus, the membranes formed using the polymer and ionic liquid lack macrovoids and thus, have stronger mechanical properties.

Figure 6:
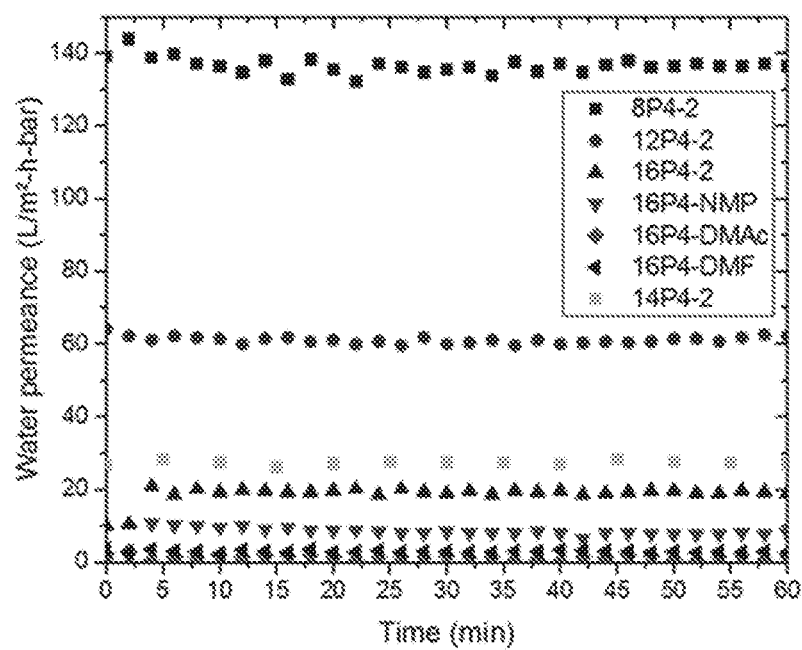
FIG. 6 is a graph showing the water permeance of the membranes containing 8% (8% PES-IL), 12% (12% PES-IL), 14% (14% PES-IL), or 16% (16% PES-IL) polymer prepared with the ionic liquid ([EMIM]DEP) and the membranes prepared with NMP (16% PES-NMP), DMAc (16% PES-DMAc) or DMF (16% PES-DMF).
Figure 7:
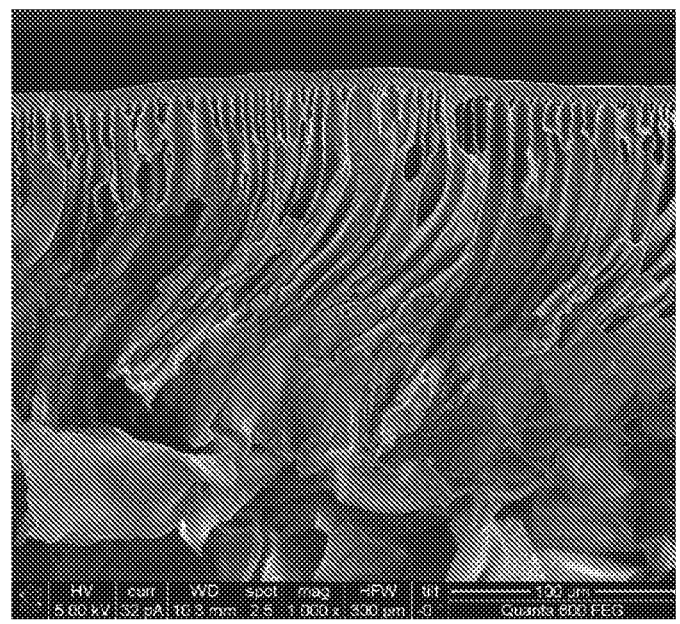
FIG. 7 is a microscopy image showing a cross-section of a membrane comprising 10% PVDF and 90% [EMIM]DEP at magnification 1000×. The membrane was 150 to 180 µm thick.
Figure 8:
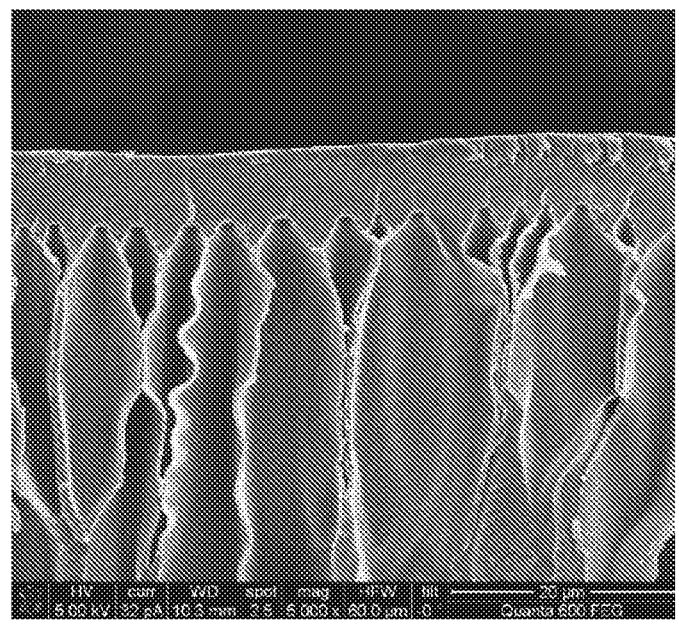
FIG. 8 is a microscopy image showing a cross-section of a membrane comprising 10% PVDF and 90% [EMI]DEP at magnification 5000×.
Figure 9:
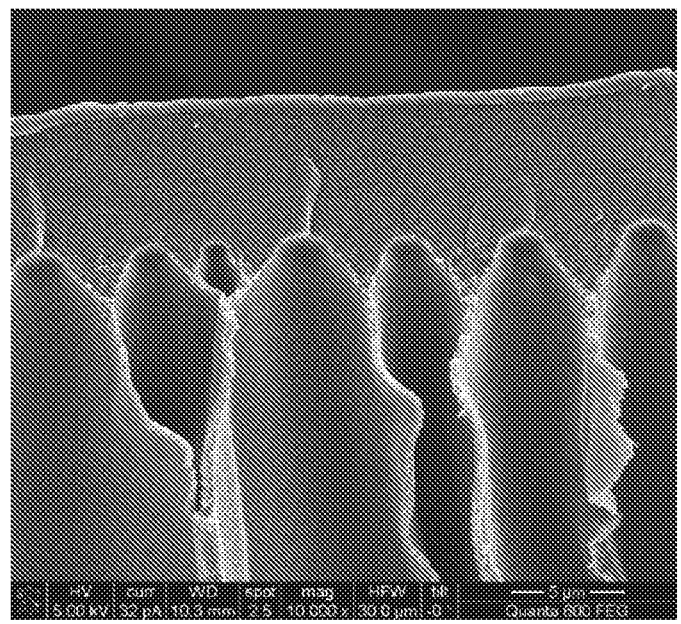
FIG. 9 is a microscopy image showing a cross-section of a membrane comprising 10% PVDF and 90% [EMIM]DEP at magnification 10,000×.
Figure 10:
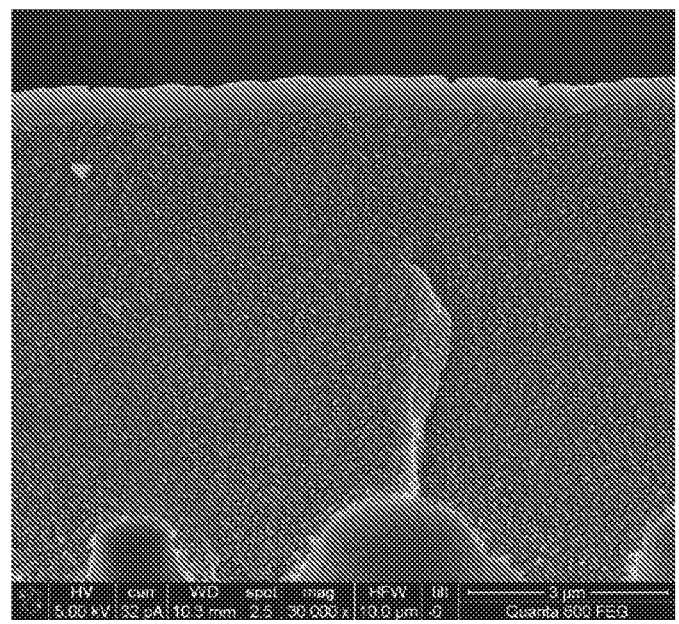
FIG. 10 is a microscopy image showing a cross-section of a membrane comprising 10% PVDF and 90% [EMIM]DEP at magnification 30.000×.
Figure 11:
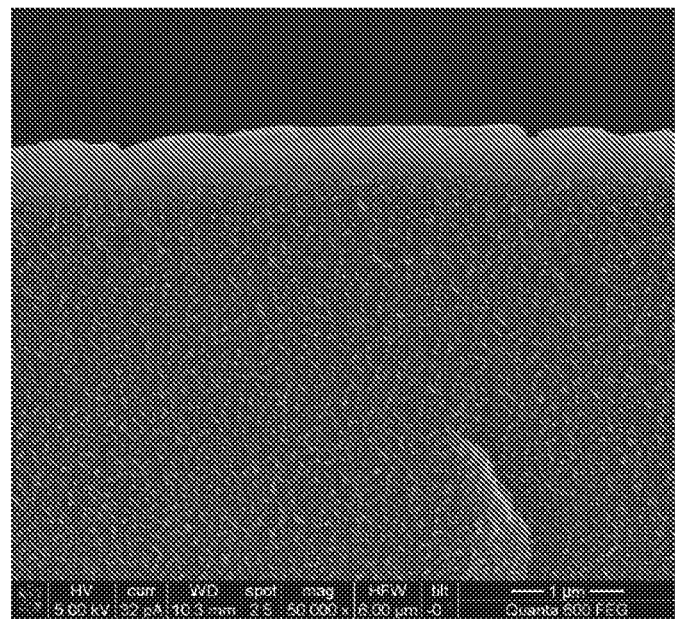
FIG. 11 is a microscopy image showing a cross-section of a membrane comprising 10% PVDF and 90% [EMIM]DEP at magnification 50,000×.

FIG. 6 shows the results of water permeance of each membrane. Specifically, FIG. 6 shows that the membranes prepared with the ionic liquid had better flux compared to the membranes prepared with solvents commonly used for membrane fabrication, i.e., NMP, DMAc, and DMF.

Table 1 shows the rejection of each membrane. Specifically, Table 1 shows that the membranes prepared with ionic liquid have better rejections compared to the membranes prepared with NMP, DMAc, and DMF. The membrane test conditions were 2 bar (pressure), 0.1 wt % 6000 g/mol PEG, 0.1 wt % 10,000 g/mol PEG, 0.1 wt % 35,000 g/mol PEG, 0.1 wt % 100,000 g/mol PEO, 0.1 wt % 600,000 g/mol PEO (feed solution).

TABLE 1

Rejection Characteristics of Membranes Prepared with Ionic Liquid (IL) or Other Solvents.

| Mw | 8% PES-IL | 12% PES-IL | 14% PES-IL | 16% PES-IL | 16% PES-NMP | 16% PES-DMAc | 16% PES-DMF |
|---|---|---|---|---|---|---|---|
| 600,000 | 100.0 | 100.0 | 100.0 | 100.0 | 100.0 | 100.0 | 100.0 |
| 100,000 | 100.0 | 100.0 | 100.0 | 100.0 | 100.0 | 100.0 | 100.0 |
| 35,000 | 99.2 | 100.0 | 100.0 | 100.0 | 97.0 | 97.1 | 94.2 |
| 10,000 | 48.4 | 100.0 | 100.0 | 100.0 | 46.2 | 67.3 | 33.3 |
| 6,000 | 15.9 | 100.0 | 100.0 | 100.0 | 25.1 | 62.1 | 23.6 |
| 1,500 | 3.5 | 43.6 | 100.0 | 100.0 | 8.6 | 57.9 | 12.6 |
| 300 | 1.2 | 15.9 | 40.1 | 52.9 | 5.3 | 58.7 | 10.2 |

Example 2

Membrane Fabrication Using Fluoropolymer and Ionic Liquid

Figure 12:
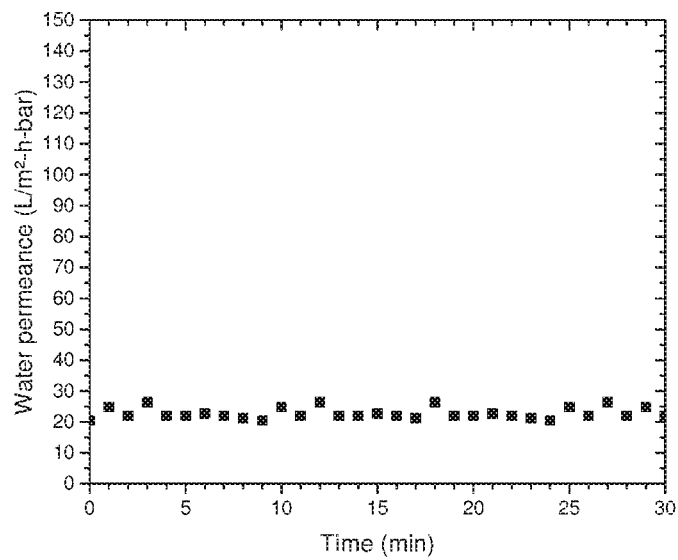
FIG. 12 is a graph showing the water permeance of the membrane prepared with PVDF and ionic liquid [EMIM]DEP. The water permeance of this membrane was approximately 25 LMH/bar.

A polymer solution was prepared with the composition, 10% PVDF/90% [EMIM]DEP in 90° C. It was then cast on a glass plate in a room temperature and immersed into water to separate the phase of this polymer solution by exchanging solvent in the polymer solution to non-solvent, water. FIGS. 7-11 are images showing the cross-section morphology of the membrane prepared with 10% PVDF/90% [EMIM]DEP. This membrane has a dense selective layer and porous substrate with finger-like and sponge-like structures. FIG. 12 shows that the membrane has a water penneance of approximately 25 LMH/bar. Table 2 shows the rejection characteristics of the fluoropolymer membrane. The test conditions were: 2 bar (pressure), 0.1 wt % 6000 g/mol PEG, 0.1 wt % 10,000 g/mol PEG, 0.1 wt % 35,000 g/mol PEG, 0.1 wt % 100,000 g/mol PEO, 0.1 wt % 600,000 g/mol PEO (feed solution).

TABLE 2

Rejection Characteristics of Membranes Prepared with Fluoropolymer and Ionic Liquid.

| Mw | 10% PVDF/ 90% IL |
|---|---|
| 600000 | 100 |
| 100000 | 100 |
| 35000 | 100 |
| 10000 | 100 |
| 6000 | 78.3 |
| 1500 | 11.9 |
| 300 | 7.1 |

Table 2 shows that this membrane can reject completely molecules over 10,000 Mw.

Example 3

Green Membrane Manufacture for Peptide Separations

Nanostructured polymeric membranes are key tools in biomedical applications, such as hemodialysis and protein separations in the food industry and in drinking water supply from seawater. Despite of the success in different separation processes, membrane manufacture itself is at risk, since the commonly used solvents are about to be banned in many countries due to environmental and health issues. Described herein is the preparation of polyethersulfone membranes based on dissolution in the ionic liquid 1-ethyl-3-methyl-imidazolium dimethylphosphate ([EMIM]DEP). A series of membranes was tailored for separation of solutes with molecular weight of 30, 5, 1.3, and 1.25 kg mol$^{-1}$ with respective water permeances of 140, 65, 30, and 20 L m$^{-2}$ h$^{-1}$ bar$^{-1}$. The membranes were demonstrated to have superior efficiency in the separation of complex mixtures of peptides with molecular weights in the range of 800 to 3500 g mol$^{-1}$. Furthermore, the thermodynamics and kinetics of phase separation leading to the pore formation in the membranes were investigated. The rheology of the solutions and the morphology of the prepared membranes were examined and compared to those of polyethersulfone in organic solvents currently used for membrane manufacture.

Biomedical separations (K.V. Peinemann and S. P. Nunes, Membrane Technology, Volume 1:Membranes for Life Sciences, John Wiley & Sons, 2011), food processing (K.-V. Peinemann, S. P. Nunes and L. Giorno, Membrane Technology, Volume 3: Membranes for Food Applications, John Wiley & Sons, 2011), water desalination (M. A. Shannon, P. W. Bohn, M. Elimelech, J. G. Georgiadis, B. J. Mariñas and A. M. Mayes, Nature, 2008, 452, 301-310), and purification (N. L. Le and S. P. Nunes, Sustainable Materials and Technologies, 2016, 7, 1-28) heavily count on nanostructured polymeric membranes. For industrial membrane manufacture, an important step is the casting of polymer solutions. Polysulfone (PSU) and polyethersulfone (PES) are among the most successful polymers in this field. However, despite of the success of membrane technology, membrane manufacture itself is now under scrutiny. Solution casting uses relatively harmful solvents, such as dimethylformamide, N-methyl pyrrolidone, and dimethyl acetamide, (Y. S. Toh, F. Lim and A. Livingston, Journal of Membrane Science, 2007, 301, 3-10) These solvents are now included in the Registration, Evaluation, Authorization, and Restriction of chemicals (REACH) of the European Chemicals Agency (EACH) (The European Chemicals Agency, http://echa.europa.eu)), with perspectives to be banned in the near future and not be applicable anymore for membrane industrial fabrication, at least in Europe. It has been recently reported that the membrane manufacture industry produces 50 billion liters of wastewater containing toxic solvents per year. (M. Razali et al., Green Chemistry, 2015, 17, 5196-5205) Finding green alternatives for membrane manufacture is urgently needed. (G. Szekely et al., Green Chemistry, 2014, 16, 4440-4473; A. Figoli et al., Green Chemistry, 2014, 16, 4034-4059) A process is described in which PES is fully dissolved in an ionic liquid, without addition of any other organic solvent.

Ionic liquids are considered green solvents (R. D. Rogers and K. R. Seddon, Science, 2003, 302, 792-793) from the perspective of enabling processes with no generation of harmful volatile organic chemicals (VOC). (E. Santos et al., Journal of Membrane Science, 2014, 452, 277-283), even if aspects related to the synthesis, life cycle and toxicity in wastewater of some of them have been seen as less environmentally friendly than mostly claimed (Y. Zhang et al., Environmental Science & Technology, 2008, 42, 1724-1730; T. P. Thuy Pham et al., Water Research, 2010, 44, 352-372). For a sustainable membrane fabrication, ionic liquids should be recycled.

The role of ionic liquids in membrane technology has been limited to date. Ionic liquids have been used based on ion conductivity, for instance in fuel cells, (M. Armand et al., Nature materials, 2009, 8, 621-629) or their preferential interaction with $CO_2$ for gas separation. (J. E. Bara et al., Polymers for Advanced Technologies, 2008, 19, 1415-1420; J. E. Bara et al., Industrial & Engineering Chemistry Research, 2009, 48, 4607-4610; Z. Dai et al., Journal of Membrane Science, 2016, 497, 1-20; and R. D. Noble and D. L. Gin, Journal of Membrane Science, 2011, 369, 1-4) A successful strategy is the use of ionic liquid supported in porous membranes (SILMs) as medium for gas $CO_2$, or $SO_2$, (Y.-Y. Jiang et al., The Journal of Physical Chemistry B, 2007, 111, 5058-5061) separation from other gases. Ionic liquids have been also polymerized as membrane material for gas separation. (Y. Gu and T. P. Lodge, Macromolecules, 2011, 44, 1732-1736) These applications rely on the fact that polymers hardly dissolved in ionic liquids.

Ionic liquids have been seldom used for membrane fabrication. The few reports used cellulose in [EMIM]OAc (S. Livazoyic, Journal of Membrane Science, 2015, 490, 282-293), cellulose acetate in [EMIM]SCN and [BMIM]SCN (D. Y. Xing et al., Industrial & Engineering Chemistry Research, 2010, 49, 8761-8769; D. Y. Xing et al., Journal of Membrane Science, 2011, 380, 87-97), mixture of polybenzimidazole and polyimide in [EMIM]Oac (D. Y. Xing, et al., Chemical Engineering Science, 2013, 87, 194-203), and polyimidazole in [EMIM]OAc. (D. Y. Xing et al., Green Chemistry, 2014, 16, 1383-1392). Ionic liquids have been additionally used in combination with other solvents (D. Kim et al., Polymer Chemistry, 2016, 7, 113-124; P. Madhavan, et al., Journal of Membrane Science, 2015, 492, 568-577).

Polyethersulfone (PES, Ultrason®, average Mn=75,000), 1-ethyl-3-methylimidazolium diethylphosphate ([EMIN]DEP, ≥98.0%), dimethyl formamide (DMF, ≥99.8%), dimethyl acetamide (DMAc, ≥99.5%) and N-methyl-2-pyrrolidone (NMP, ≥99.0%) were supplied by Sigma-Aldrich. The polymer and the ionic liquid's structures are shown in Scheme 1. Polyethylene glycol (PEG) and polyethyleneoxide (PEO) (Sigma-Aldrich), with molecular weights 300; 1,500; 6,000; 10,000; 35,000; 100,000; and 600,000 g $mol^{-1}$, were used for solute rejection evaluation and determination of the molecular weight cut-off (MWCO). Bovine serum albumin (BSA), 1,4-Dithiothreitol (DTT), ammonium bicarbonate and trifluoroacetic acid were also obtained from Sigma Aldrich (St. Louis, Mo.). Iodoacetamide was obtained from GE Healthcare (Little Chalfont, United Kingdom). Sequencing-grade modified trypsin was supplied by Promega (Madison, Wis.). Acetonitrile was purchased from Thermo Fisher-Scientific (Waltham, Mass.).

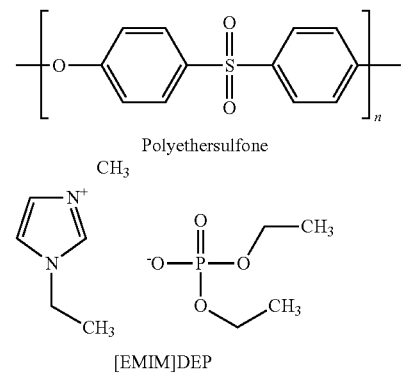

Chemical structures of PES and [EMIM]DEP.

Solution thermodynamics. The Hansen solubility parameter ($\delta$) for the ionic liquids [EMIM]DEP and [EMIM]OAc were determined by using the HSPiP software ($4^{th}$ edition 4.1.07) (C. Hansen, Boca. Raton, 2000, 168). The total solubility parameter is given by equation 1:

$$\delta^2 = \delta^2_D + \delta^2_P + \delta^2_H, \quad (1)$$

where $\delta_D$ is the contribution due to the van der Waals interactions, $\delta_P$ is relative to polar cohesive forces and $\delta_H$ is due to hydrogen bonds. Miscibility tests were performed in 44 solvents with known solubility parameters to evaluate the $\delta$ values for the ionic liquid. The phase diagram of a specific polymer/solvent solution can be theoretically estimated by calculating the Gibbs free energy of mixing, $\Delta_m$ based on $\chi$ and $\delta$. $\Delta G_m$ should be negative if only one phase is present with the polymer fully dissolved. $\Delta G_m$ can be calculated (D. Kim et al., Polymer Chemistry, 2016, 7, 113-124) with equation 2:

$$\frac{\Delta G_m}{N_A} = kT\left[\chi\phi_1\phi_2 + \frac{\phi_1}{X_l}\ln\phi_1 + \frac{\phi_2}{X_2}\ln\phi_2\right],\qquad(2)$$

where $\chi$ is the Flory-Huggins parameter. $\chi$ can be estimated from the difference between the total Hansen solubility parameters of the polymer and ionic liquid, determined as mentioned above. k is the Boltzmann constant, $N_A$ is the Avogadro number; $\phi_1$ and $\phi_2$ are the volume factions of solvent and polymer, respectively; $X_1$ and $X_2$ are the corresponding number of segments of each component. From $\Delta G_m$ values, the system compositions with the highest miscibility can be delimited, as conducted by other systems (D. Kim et al., Polymer Chemistry, 2016, 7, 113-124).

Phase diagrams for PES/solvent/water ternary systems were estimated by measuring the cloud points for each solution with addition of water. The experiments were conducted at room temperature. PES solutions of various concentrations were prepared in different solvents. Water was added to each solution until it became turbid. The detected cloud points for a specific PES/solvent/water system delineate the binodal curve, which denotes the boundary between the stable (one phase) region and the meta-stable region of the phase diagram.

The coil size distribution of PES in each solvent was measured by dynamic light scattering (Zetasizer, Malvern). 0.1 wt % PES solutions in [EMIN]DEP, NMP, DMAc, and DMF were prepared and filtered through membranes with 0.45 mm pores before analysis. The experiments were done using He—Ne laser with wavelength 633 nm.

Solution kinetics. The kinetics of the phase separation, when different casting solutions are immersed in water, was evaluated by transmittance measurement using a Cary 5000 UV-Vis-NIR, Agilent (Santa Clara, Calif.), equipment. 16 wt % PES solutions in [EMIM]DEP, NMP, DMAc, and DMF were cast on a glass plate forming a 150 μm-thick layer, which was immersed in a glass cuvette containing water. Changes of transmittance, starting from the moment of immersion in water until reaching a constant value, were monitored as a function of time at 600 nm. Values of relative light transmittance ($T_r$) were calculated by equation 3.

$$Tr = \frac{(T - T_{min})}{(T_{max} - T_{min})} \times 100\%\qquad(3)$$

where, T is transmittance at a given time; $T_{min}$ is the minimum transmittance; and $T_{max}$ is the maximum measured transmittance.

The rheological properties of polymer solutions were evaluated in an AR1500ex Rheometer (TA Instruments) at different temperatures at 1 Hz and 10% oscillation strain. The viscosity of each polymer solution was measured at 10 $s^{-1}$ shear rate.

Membrane preparation. Four binary solutions were prepared with PES in [EMIMJDEP. The following PES concentrations were chosen: 8, 12, 14, and 16 wt % PES. Additionally, 16 wt % PES solutions were prepared in NMP, DMAc and DMF. PES was dissolved in the ionic liquid at 90° C. and in NMP, DMAc, and DMF at 60° C., stirring for a day. The polymer solutions were cast on a glass plate using a doctor blade with 150 μm gap and immersed into a deionized water bath to induce phase inversion and pore formation.

Membrane characterizations. The membrane morphology was observed on FEI Quanta 200, 600, and Nova Nano Field Emission Scanning Electron Microscopes (FESEM). To avoid pore collapse, the membranes were freeze-dried. For the cross-section, freeze-dried membranes were fractured in liquid nitrogen and then sputter coated with iridium.

Water permeance and rejection of neutral solutes (PEG) were measured under 2 bar in a dead-end filtration cell, calculated with the following equations:

$$\text{Water permeance } (Lm^{-2}h^{-1}bar^{-1}) = Q \cdot A^{-1} \cdot \Delta P^{-1}\qquad(4)$$

$$\text{PEG rejection, } R\ (\%) = \left(1 - \frac{C_{perm}}{C_{feed}}\right) \times 100\%\qquad(5)$$

where Q is the permeated pure water rate (L $h^{-1}$); A is the effective membrane area ($m^2$); $\Delta P$ is the pressure; $C_{perm}$ and $C_{feed}$ are the concentrations of the permeate and feed solutions, respectively. The rejection was analyzed by Gel Permeation Chromatography (GPC) with PL aquagel-OH 40 and 60 columns, (1260 infinity GPC/SEC, Agilent technologies). The molecular weight cut-off (MWCO) is the molecular weight corresponding to 90% rejection. The feed solution composition for the PEG rejection contained 0.1 wt % 6000 PEG, 0.1 wt % 10,000 PEG, 0.1 wt % 35,000 PEG, 0.1 wt % 100,000 PEO, 0.1 wt % 600,000 PEO and the membranes were tested at 2 bar.

The solute (PEG and PEO) diameter was calculated using the Stokes radius equation (S. Singh, Journal of Membrane Science, 1998, 142, 111-127; A. Rahimpour, Journal of Membrane Science, 2010, 364, 380-388), from values of molecular weight (Equation 6 and 7):

For PEG $$a = 16.73 \times 10^{-10} M^{0.557}\qquad(6)$$

For PEO $$a = 10.44 \times 10^{-10} M^{0.587}\qquad(7)$$

where a is the Stokes radius (in cm) and M is the molecular weight of PEG and PEO (g $mole^{-1}$). The rejections were plotted as a function of the Stokes diameters (d=2a) corresponding to each molecular weight.

Protein digestion and peptide analyses. Bovine serum albumin (BSA) (Sigma-Aldrich (St. Louis, Mo.)) was digested into peptides and their rejection was evaluated in membrane filtration experiments, using a dead-end filtration cell. In summary, 500 μg of BSA dissolved in 8 M Urea Tris-HCl pH 8.5 were reduced by the addition of 10 mM DTT and incubated for 1 hour at 37° C. Proteins were alkylated by the addition of 40 mM iodoacetamide and incubated in the dark for 1 hour at 37° C. 10 mM DTT were added to the sample, which was then incubated in the dark for another 15 minutes. The sample was diluted 10 times in 50 mM ammonium bicarbonate at pH 8.5 to reduce urea concentration to <1 M. To digest the proteins, trypsin was added in a 1:50 (trypsin:protein) ratio and incubated overnight at 37° C. The digestion was stopped by the addition of trifluoroacetic acid to a final concentration of 2%. The sample was cleaned via reverse phase purification with Sep-Pak C18 cartridges (Waters Corporation (Milford, Mass.)), dried in a speedvac, re-suspended in 50 μl of 3% acetonitrile 0.1% trifluoroacetic acid in MQ water and used as feed. The peptide concentration was measured with Nanodrop at 280 nm wavelength.

To measure the rejection of the peptides, feed solutions containing 40 μg of peptides were filtrated by the membranes fabricated from PES[EMIM]DEP solutions using a sterilized Amicon cell (Millipore (Billerica, Mass.)) under 2 bar. Feed and permeates were weighed, dried in a speedvac, and resuspended in 30 µl of 3% acetonitrile (Thermo Fisher-Scientific (Waltham, Mass.)) 0.1% trifluoroacetic acid in MQ water. 2 µl per sample (feed and permeate) were loaded into the LC/MS (Ultimate 3000 UHPLC/Q-Exactive, Thermo Fisher-Scientific (Waltham, Mass.)) with an Acclaim PepMap RSLC 75 µm×15 cm nanoViper column (Dionex, Sunnyvale, Calif.). Peak files were compared against UniProt database through MASCOT. (J. S. Cottrell and U. London, Electrophoresis, 1999, 20, 3551-3567) MASCOT search results were combined and analyzed with Scaffold. (B. C. Searle, Proteomics, 2010, 10, 1265-1269) Spectral counts from Scaffold were used to calculate the BSA peptide rejection (%) for each membrane as function of the peptides identified in the feed solution.

Ionic liquid recovery. The waste containing a mixture of [EMIM]DEP and water from the coagulant bath, after fabricating membranes was treated to recycle [EMIM]DEP. Few steps were carried out to increase the concentration of [EMIM]DEP. First, the water was evaporated in rotavapor (Buchi (New Castle, De.), Rotavapor R-215) at 90° C. (heating); 5° C. (cooling); 80 rpm (rotating speed), under 250 mbar (vacuum) for 2 hrs. Second, the solution was submitted to vacuum at 130° C. Third, magnesium sulfate (MgSO$_4$) was added to the solution to capture the remaining water and then centrifuged. The recycled ionic liquid concentration was quantified in all steps by refractometry (AR2008 Digital Abbe Refractometer, KRÜSS (Hamburg, Germany)) using a calibration curve in all steps.

Figure 13A:
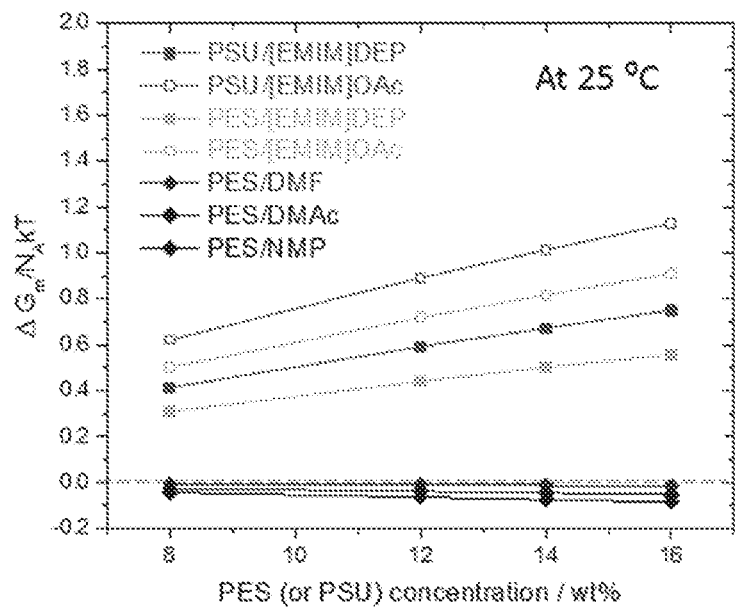
FIGS. 13A and 13B are graphs showing (a) $\Delta G_m$ estimated for PES and PSU solutions in different solvents and polymer concentrations at 25° C. and (b) at 90° C.
Figure 13B:
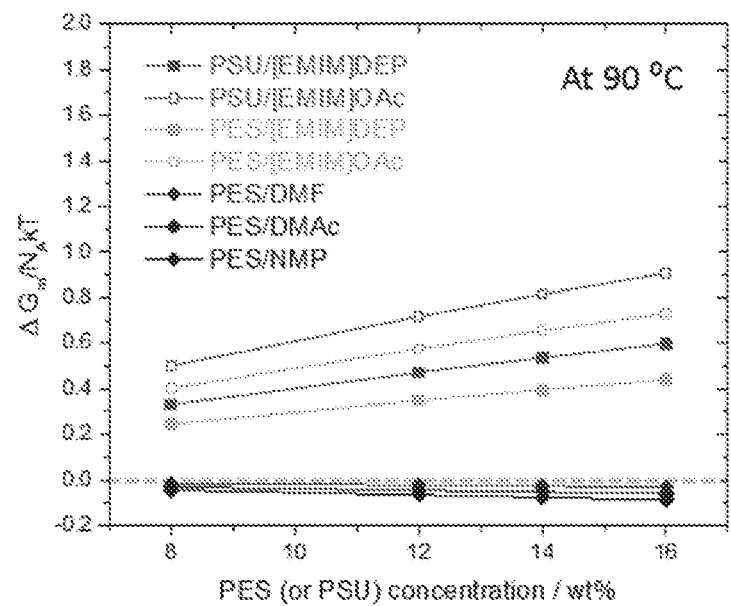

Solution thermodynamics. The Hansen solubility parameter (δ) of the ionic liquids [EMIM]DEP and [EMIM]OAc was estimated with the HSPiP software based on miscibility tests between the ionic liquids and 44 solvents. The δ value for PES was previously reported by Hansen. (C. Hansen, Boca Raton, 2000, 168) The estimated differences between values for PES and ionic liquids, $|\delta_{PES}-\delta_{[EMIM]DEP}|$ and $\delta_{PES}-\delta_{[EMIM]OAc}|$, were 4.9 and 8.7, respectively, indicating that [EMIM]DEP is indeed a better solvent for PES than [EMIM]OAc. $|\delta_{PSU}-\delta_{[EMIM]DEP}|$ is 5.4. This difference is already large enough to disfavor solubilization. From δ values for PES, [EMIM]DEP, [EMIM]OAc and other solvents, the Flory Huggins parameters, χPES/[EMIM]DEP; χPES/[EMIM]OAc; and χPES/DMF or DMAc or NMP, were calculated and applied to obtain $\Delta G_m$ for different concentrations. FIG. 13 compares $\Delta G_m$ values for different systems at 25° C. and 90° C. $\Delta G_m$ for PES/[EMIM]DEP is positive in all range of concentrations, but it is lower than for PES/[EMIM]OAc and for PSU/[EMIM]DEP. The values for PES in NMP, DMAc, and DMF are negative. For non-charged organic solvents, $\Delta G_m$ can be calculated from δ and χ values, which mainly take into consideration interaction contributions of van der Waals forces, polarity, and hydrogen bonds. The $\Delta G_m$ estimation in the case of ionic liquids is a relatively rough approximation, since additional strong coulombic interactions are not taken into account and ionic liquids are more complex systems than ordinary organic solvents. But the relative values shown in FIG. 13 are a good indication of the quality of different solvents for PES and PSU. By comparing FIGS. 13A and 13B, the effect of temperature on the solubility of PBS in ionic liquids can be seen. $\Delta G_m$ decreases as the temperature is increased from 25° C. to 90° C., a clear indication that the solubility is higher at higher temperatures.

Figure 14:
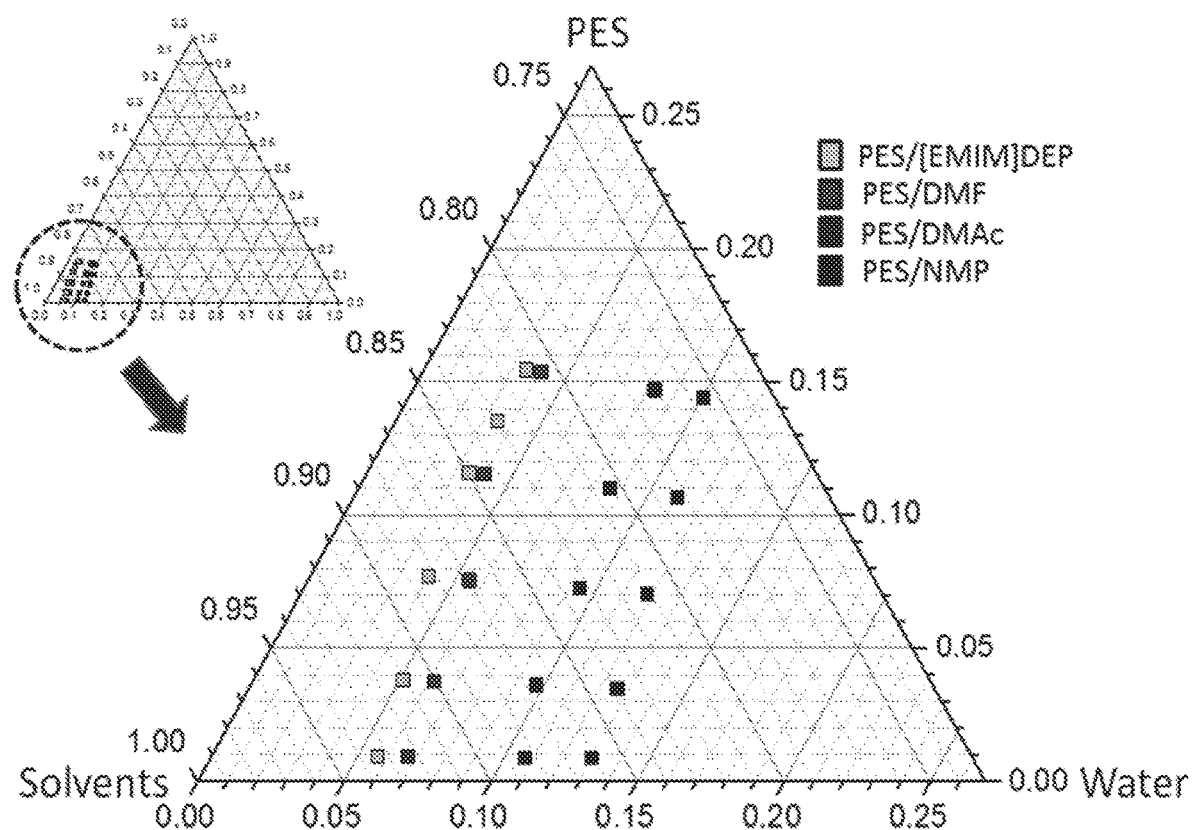
FIG. 14 is a phase diagram measured by cloud point test at 25° C.

FIG. 14 shows the phase diagrams for different PES/solvent/water systems obtained by measuring their cloud points. The 2 phases region increases in the following order of PES/NMP<PES/DMAc<PES/DMF≤[EMIM]DEP. The estimated $\Delta G_m$ for 16 wt % PES solutions increases in the same sequence. An indication of the solvent quality for a specific polymer is given also by the size of the coil in a diluted solution measured by DLS. The values of coil size for 0.1 wt % PES solutions in NMP, DMAc, and DMF are 17, 15, and 13 nm, respectively (Table 3). A better polymer-solvent interaction leads to coil expansion, which is consistent with the sequence of $\Delta G_m$ values measured for higher polymer concentration. The coil size in [EMIM]DEP was 15 nm, which is in the same range as in DMAc and even larger than in DMF.

TABLE 3

Coil diameters (Z-average) and polydispersity measured by DLS for 0.1 wt % PES solutions in different solvents; calculated Rg and c* values.

| Solvent | Diameter Z-Average (nm) | PDI | Rg (nm) | C* (wt %) |
|---|---|---|---|---|
| NMP | 17.3 ± 0.2 | 0.18 | 6.6 | 10.0 |
| DMAc | 15.7 ± 0.2 | 0.19 | 6.0 | 15.4 |
| DMF | 13.3 ± 0.3 | 0.18 | 5.1 | 22.6 |
| [EMIM]DEP | 15.3 ± 0.3 | 0.23 | 6.0 | 15.4 |

Figure 15:
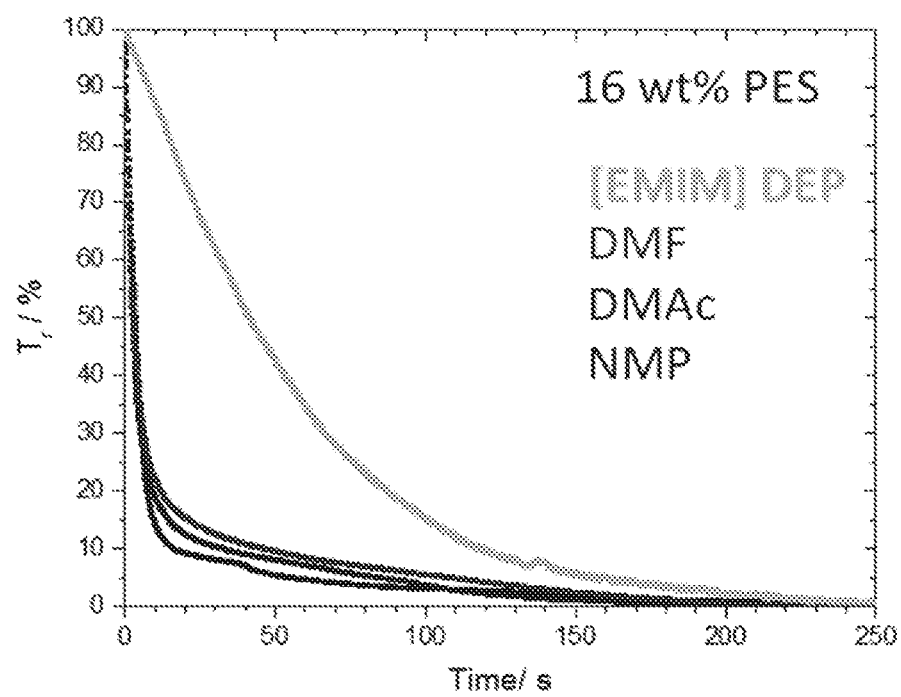
FIG. 15 is a graph showing relative light transmittance, Tr, (600 nm wavelength) of 16 wt % PES solutions in different solvents cast as a 150 µm-thick layer as a function of time, after immersion in water.

Solution kinetics. The membrane morphology is highly influenced by the solution thermodynamics and by the kinetics of phase separation. The kinetics was investigated for 16 wt % PES solutions, by measuring the transmittance reduction when the solution is immersed in water. The results are shown in FIG. 15. The phase separation kinetics for solutions in NMP, DMAc and DMF is very similar, with abrupt turbidity increase in the first 10 s, after immersion in water. For solutions in [EMIM]DEP, the turbidity increase is slower. This could be a consequence of higher solution viscosity, which delays the water-solvent exchange. The curves delineated by the cloud points (FIG. 14) can be considered coincident with the binodal curve separating the stable (one phase) region of the phase diagram and the metastable region. The metastable region was separated from the instable (2 phases) region by spinodal curves (S. P. Nunes and T. Inoue, Journal of Membrane Science, 1996, 111, 93-103). If the water-solvent exchange is fast, the solution was quenched into 2-phases region and phase separation followed the spinodal decomposition mechanism, starting with continuous oscillations of concentration. If the water-solvent exchange is slow, the system stayed relatively long in the metastable region, between binodal and spinodal curves. In this case, nucleation and growth were the predominant mechanism (S. P. Nunes, Macromolecules, 2016 49 (8), pp 2905-2916): This mechanism was likely favored in PES[EMIM]DEP solutions immersed in water, whereas spinodal decomposition would prevail in other solvents.

Independently of the phase separation mechanism, after entering the 2-phases region the system separated in a dilute phase, which gave rise to the pores and a continuous matrix with high polymer concentration. When the concentration of this phase was high enough, the mobility of the phase separated systems was so low that the morphology was immobilized, kinetically trapped.

As long as the viscosity of the concentrated phase was still low enough, the morphology evolved, the dilute phase changed in size and form, giving rise to larger pores before further water-solvent exchange proceeds and the system solidifies. In addition to the microporous morphology guided by phase separation, membranes frequently had large finger-like cavities, which were highly influenced by solution viscosity and are discussed below.

Solution rheology. The viscosity of 16 wt % PES solutions in the different solvents and in different concentrations for solutions in [EMIM]DEP was investigated as a function of temperature. See FIG. 16A. The viscosity of 16 wt % PES solutions in [EMIM]DEP was up to 500-fold higher than in other solvents (NMP, DMAc or DMF) at room temperature (25° C.). An abrupt decrease was observed as the temperature increased. The viscosity values became similar as the temperature approached 70° C. The influence of concentration was directly related to the extent of entanglement between coils. Above the scaling critical concentration (c*) the coils began to entangle, entering the semi-diluted regime (FIG. 16B, inset). c* was estimated from values of the radius of gyration (W. W. Graessley, The entanglement concept in polymer rheology, Springer, 1974.), Rg, using equation 8:

$$c^* = \frac{M}{\frac{4}{3}\pi N_A R_g^3}, \qquad (8)$$

where M is the polymer molecular weight.

Figure 16A:
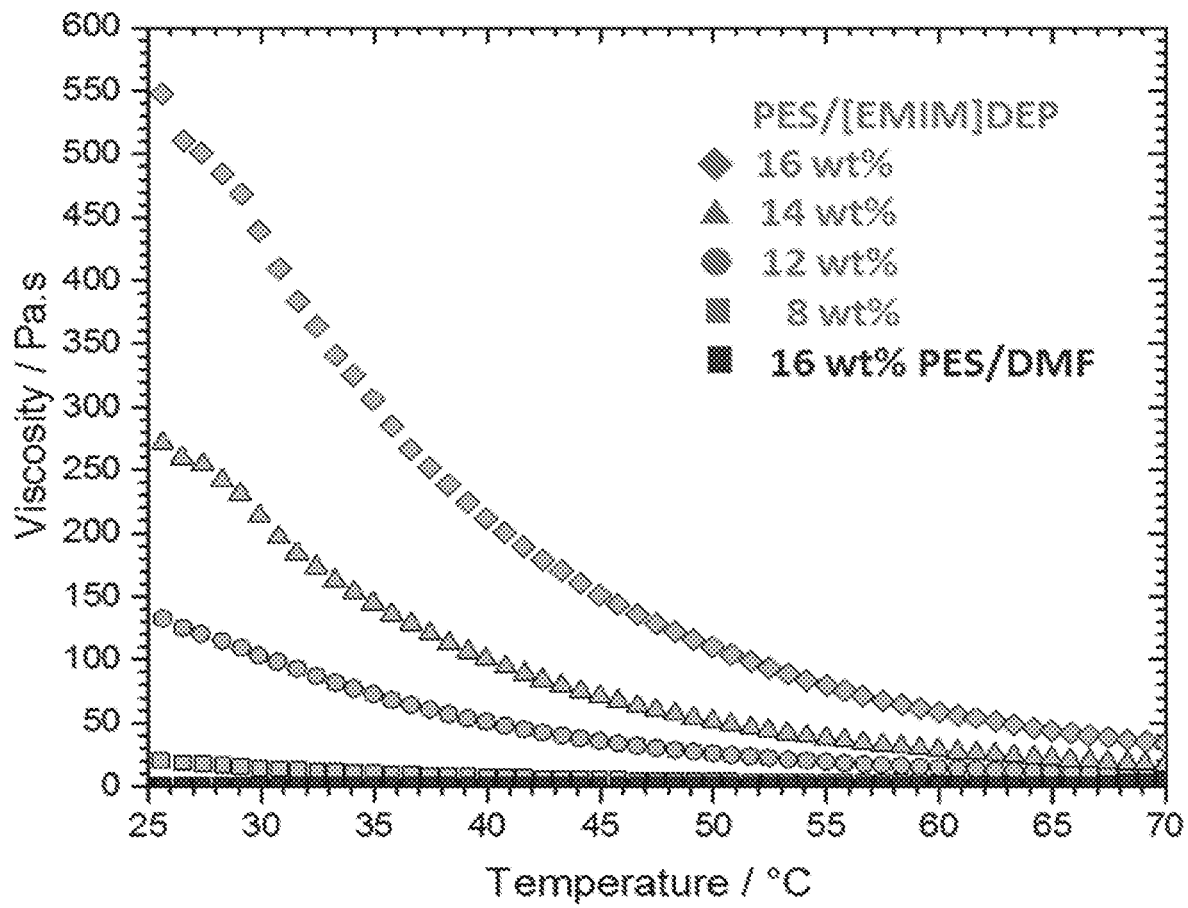
FIG. 16A is a graph showing viscosity at shear rate 10 s$^{-1}$ as a function of temperature for PES/[EMIM]DEP solutions with different concentrations; the bottom curve corresponds to 16 wt % PES solutions in DMF, NMP or DMF, which are practically coincident at this scale.
Figure 16B:
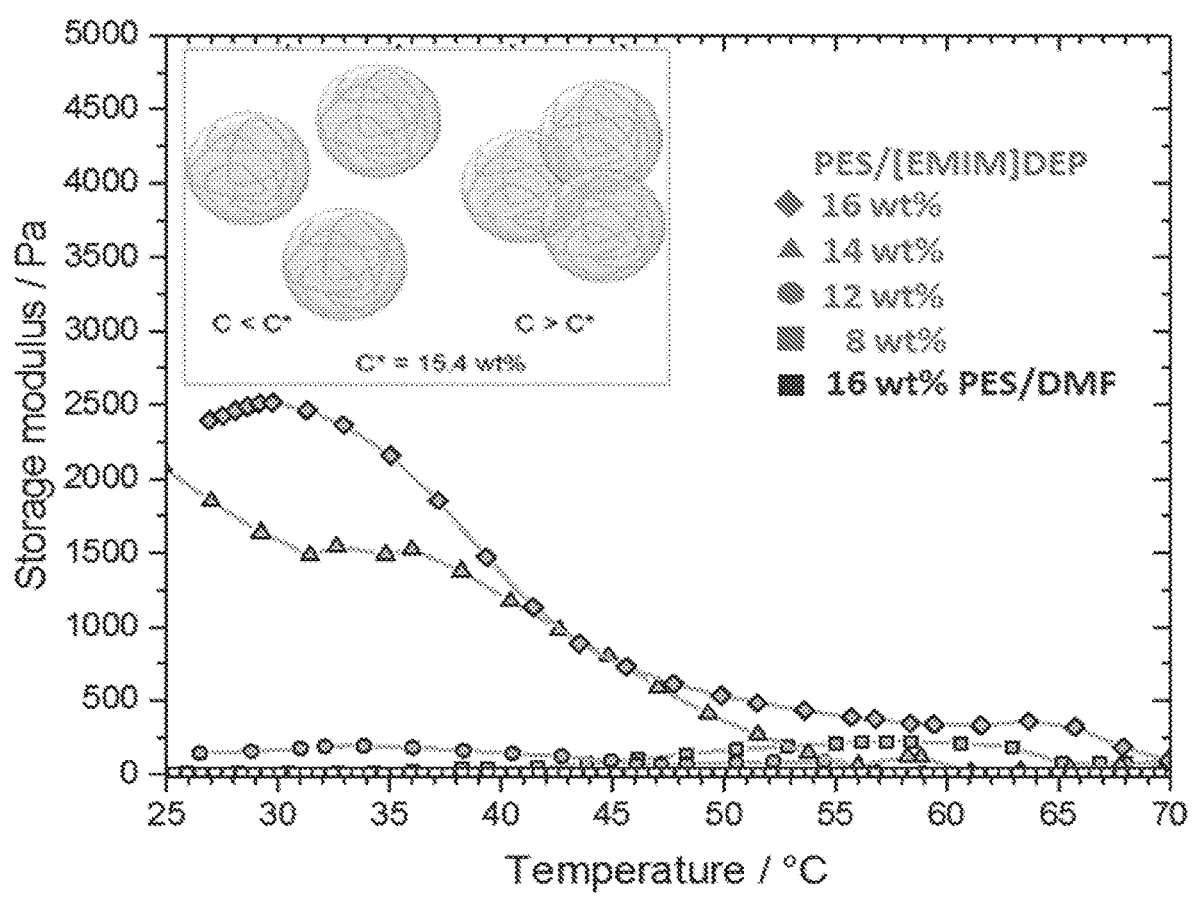
FIG. 16B is a graph showing storage modulus G' at 1 Hz and oscillation strain 10% as a function of temperature for 8-16 wt % PES/[EMIM]DEP and 16 wt % PES/DMF solutions; curves for 16 wt % PES in NMP and DMAc coincide with that in DMF; inset: representation of polymer coils in solutions with concentrations below and above c*.
Figure 16C:
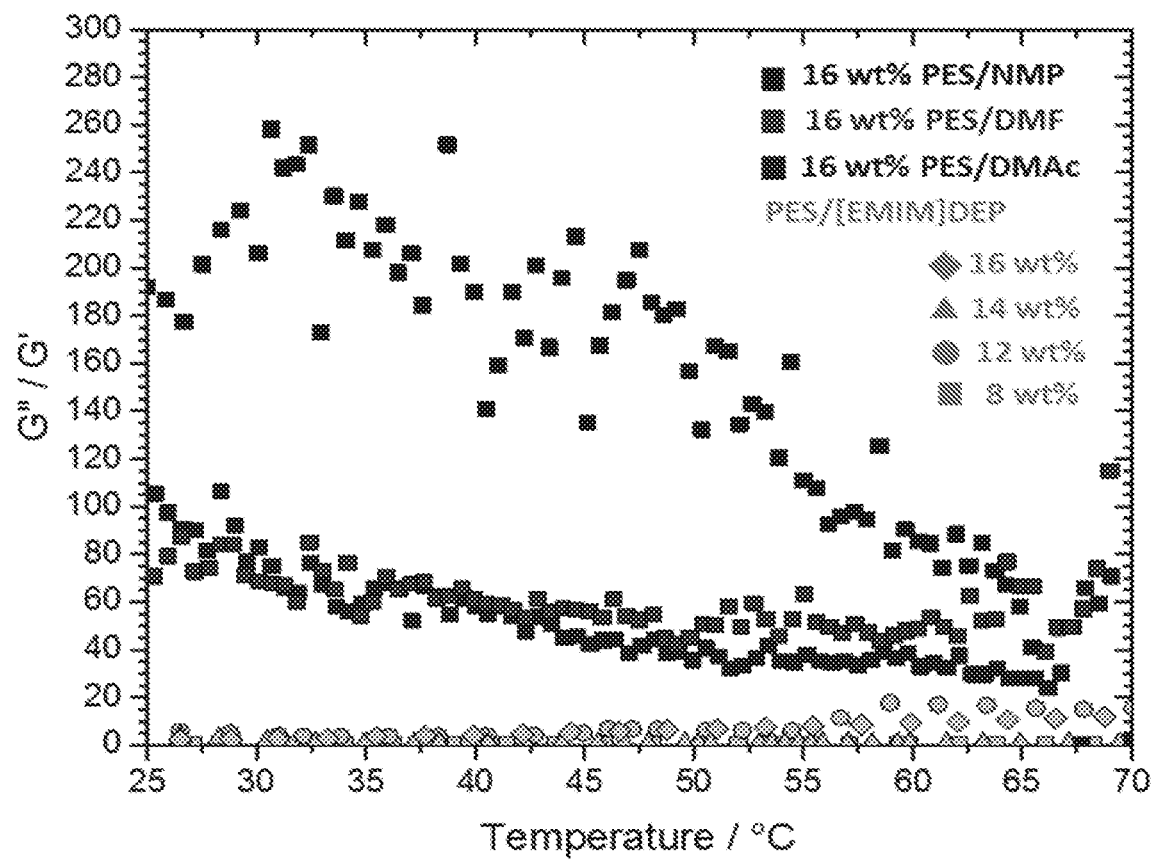
FIG. 16C is a graph showing G"/G' ratios as a function of temperature measured at 1 Hz and oscillation strain 10% for PES/[EMIM]DEP solutions with temperature range, the viscosity has a strong dependence on different concentrations and 16 wt % PES solutions in NMP, DMF, and DMAc.

The z-average diameters in Table 3, obtained by DLS, were a measure of the hydrodynamic diameters ($D_H$2$R_H$) of the polymer coils in different solvents. In theta solvents, Rg=0.77 $R_H$, where $R_H$ is the hydrodynamic radius (C. M. Kok and A. Rudin, Die Makromolekulare Chemie, Rapid Communications, 1981, 2, 655-659). Therefore, c*, for PES/[EMIM]DEP, was estimated as being around 15.4 wt % (Table 1). FIG. 16B shows how the values of the storage modulus G' changed as a function of temperature for solutions with different PES concentration in [EMIM]DEP. G' was used as a a measure of elasticity. The absolute values of G' were higher for the 16 wt % PES solution than for 8 wt %. 16 wt % was above c*, 8 wt % was far below c* and therefore with poor entanglement between coils. The ratio between the loss modulus G" and G', as a function of temperature, is shown in FIG. 16C. It indicated the solution capacity to dissipate energy, behaving more like a liquid and less like a gel at high ratios. G"/G' was particularly high for 16 wt % PES solutions in NMP and decreased in this sequence: NMP>DMAc≥DMF>[EMIM]DEP (G"/G'=193, 105, 79, 2, respectively at 25° C.). The gel character of PES solutions in [EMIM]DEP was therefore higher than in other solvents. As the temperature increased, the G"/G' ratios for different solvents became more similar. 16 wt % PES solutions in NMP were also above c* (estimated as 10 wt % for PES in NMP in Table 1). However, NMP was a better solvent for PES than [EMIM]DEP with lower $\Delta G_m$. NMP acted as a plasticizer, reducing the friction between polymer-polymer segments, leading to low viscosity (FIG. 16A) and low elasticity.

Figure 17:
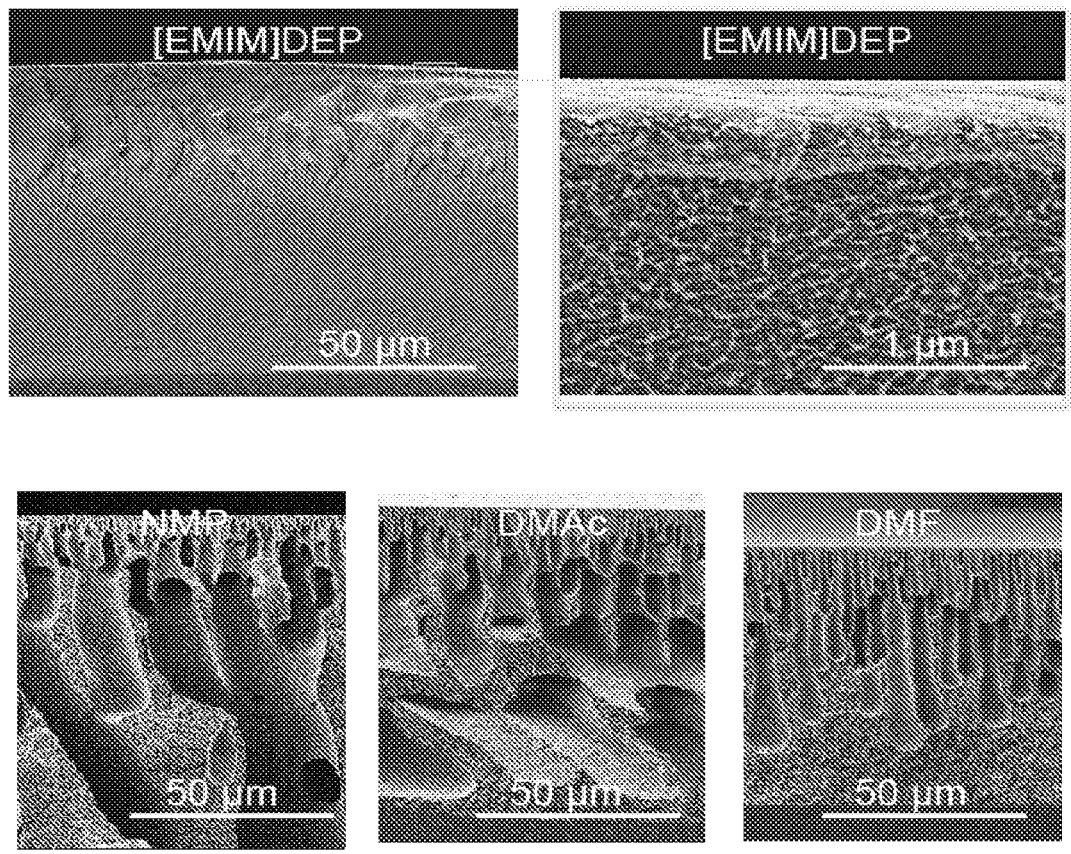
FIG. 17 are FESEM images of cross-sections of membranes prepared from 16 wt % PES solutions in [EMIM]DEP, NMP, DMAc, and DMF.

Membranes were prepared from 16 wt % PES solutions in different solvents and different concentrations in [EMIM]DEP. Their morphologies were investigated by field emission scanning electron microscopy (FESEM) as shown in FIG. 17. Membranes prepared from 16 wt % casting solutions in NMP, DMAc, and DMF had finger-like porous structures. Membranes cast from solutions in [EMIM]DEP were sponge-like, regardless of the polymer concentration (from 8 to 16 wt %, FIG. 17), different than in other solvents. Pores could hardly be observed, even at high magnification when [EMIN]DEP was used as solvent. This morphology was favoured by the high viscosity of the casting solution (20-550 Pascal-second (Pa·s), as seen in FIG. 16A), which promotes a slow phase separation. When the water-ionic liquid exchange took place, after immersion in the coagulation bath, the system long remained metastable. Phases diluted in polymer did not evolve to form large pores. The ionic liquid diffused into the bath and water came into the polymer concentrated layer immobilizing the morphology as seen in the final membrane. With other solvents the solution viscosity was lower than 10 pascal-seconds (Pa·s). Phase separation was fast (see FIG. 15). By immersion in water the system was quenched into the 2-phases region of the phase diagram, which favoured spinodal decomposition to form the pores. Moreover, high viscosity hindered the formation of finger-like cavities or macrovoids in solutions with ionic liquid. Macrovoids were caused by the abrupt intrusion of water into the solution layer, promoted by local instabilities of interface tension at the border between polymer solution and water. Low viscosity facilitated the uncontrolled water invasion. (S. P. Nunes and Klaus-Viktor Peinemann, Membrane Technology: in the Chemical Industry, John Wiley & Sons, 2006; S. C. Pesek and W. J. Koros, Journal of Membrane Science, 1993, 81, 71-88; I. Pinnau and W. J. Koros, Journal of Membrane Science, 1992, 71, 81-96) Macrovoids are seen in FIG. 17 for membranes prepared from solutions in NMP, DMAc and DMF, which had much lower viscosity than those in ionic liquid.

Figure 18A:
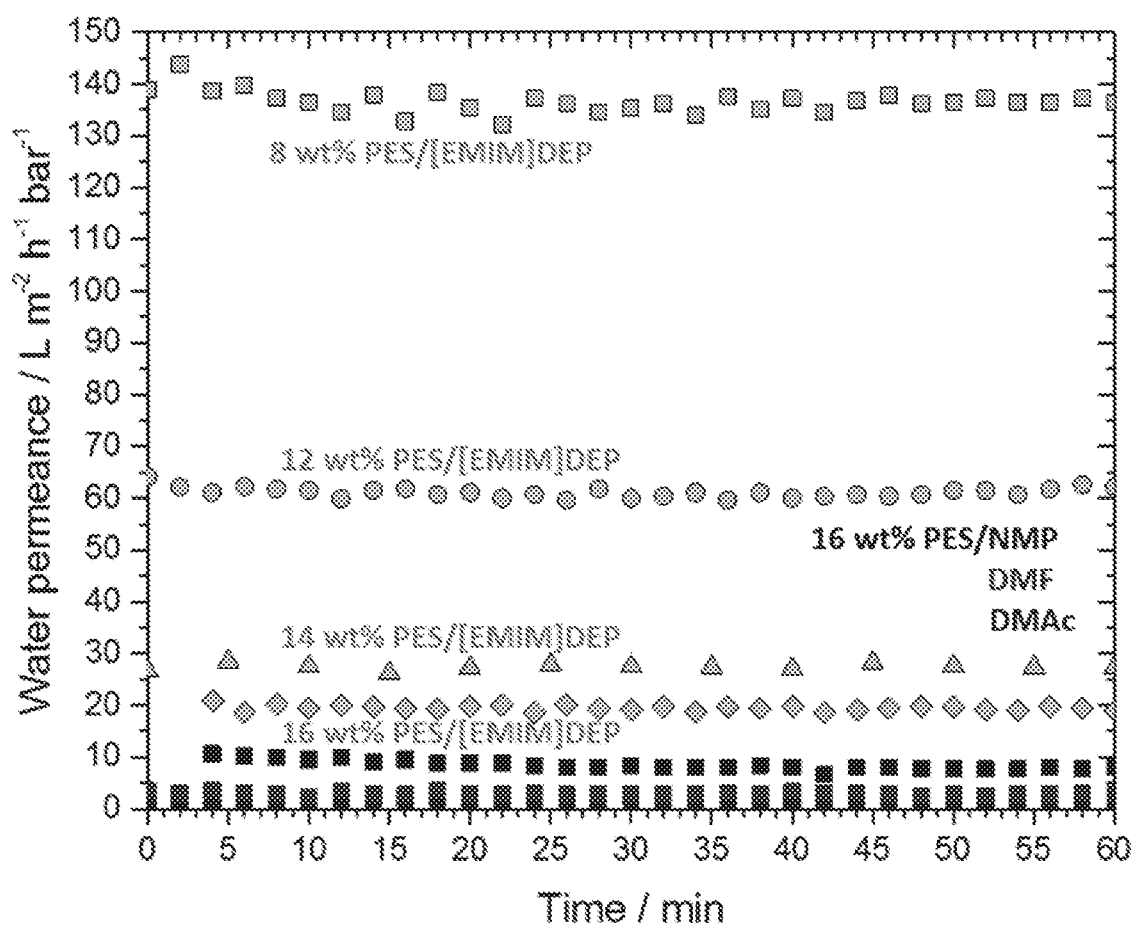
FIG. 18A is a graph showing water permeance as a function of time, measured for membranes prepared from PES/[EMIM]DEP solutions with different polymer concentrations and 16 wt % PES solutions in NMP, DMF, and DMAc.

Membrane performance. The water permeances of the nanoporous membranes cast from PES/[EMIM]DEP solutions were measured and compared with membranes cast from solutions in NMP, DMAc and DMF. Although the pores of membranes fabricated from PES/[EMIM]DEP were smaller, their water permeance was higher than that of membranes cast from solutions in the other solvents, as shown in FIG. 18A. The water permeances of the membranes fabricated from 16 wt %, 14 wt %, 12 wt %, and 8 wt % PES solutions in [EMIM]DEP were 20, 30, 65, and 140 L m$^{-2}$ h$^{-1}$ bar$^{-1}$. Comparing the membranes prepared with the same PES concentration (16 wt %) in different solvents, the penneances of those cast from solutions in [EMIM]DEP were 2 times higher than in NMP, 6-fold higher than in DMAc, and 20-fold higher than in DMF.

Figure 18B:
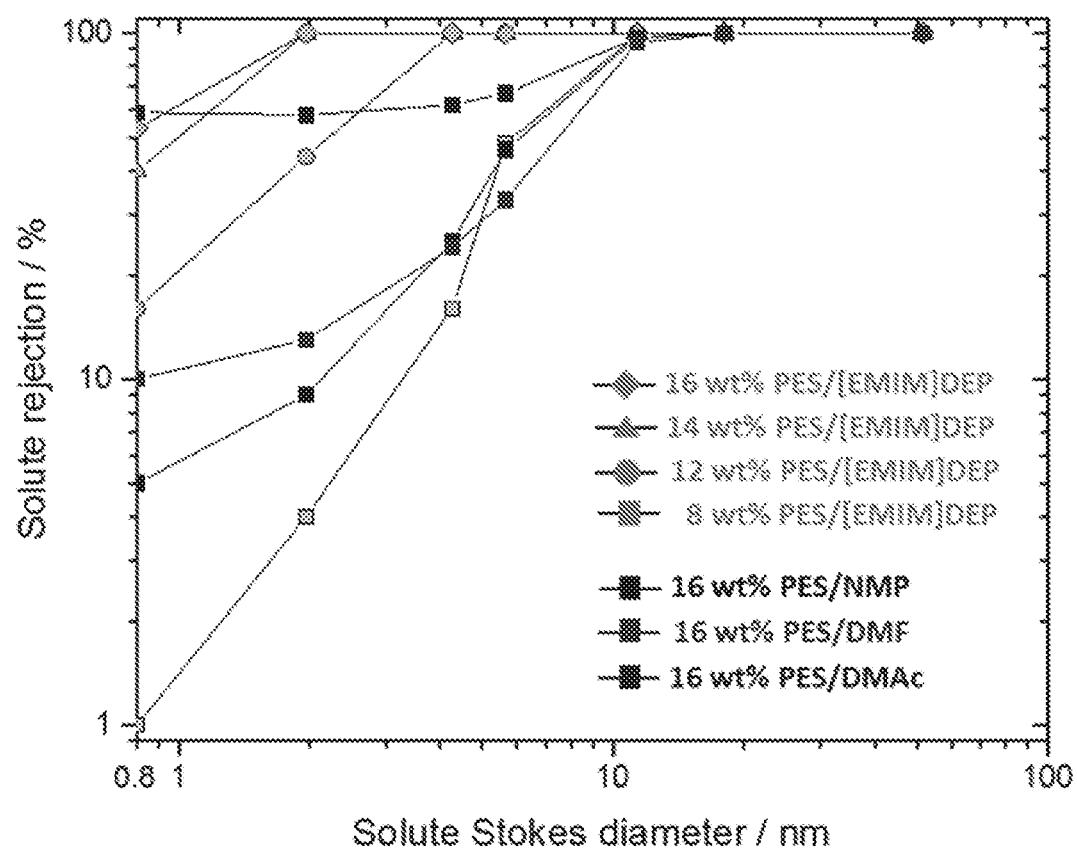
FIG. 18B is a graph showing PEG (and PEO) rejections for the same membranes tested in FIG. 18A.
Figure 18C:
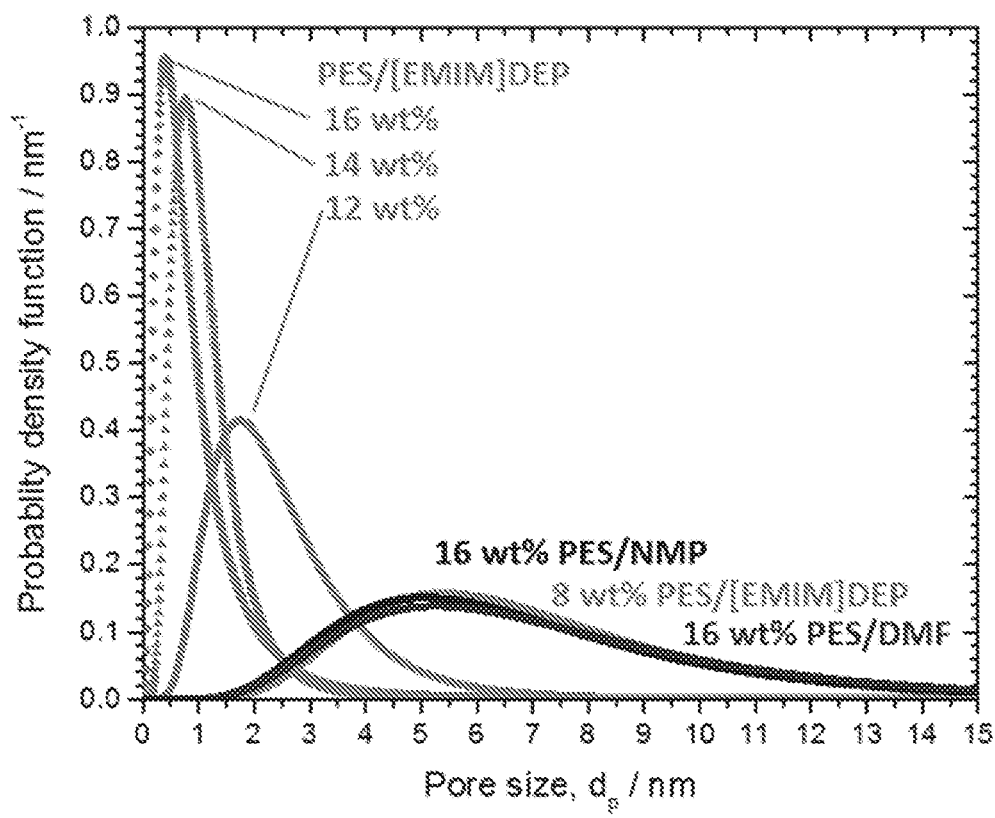
FIG. 18C is a graph showing estimated pore size distributions.
Figure 18D:
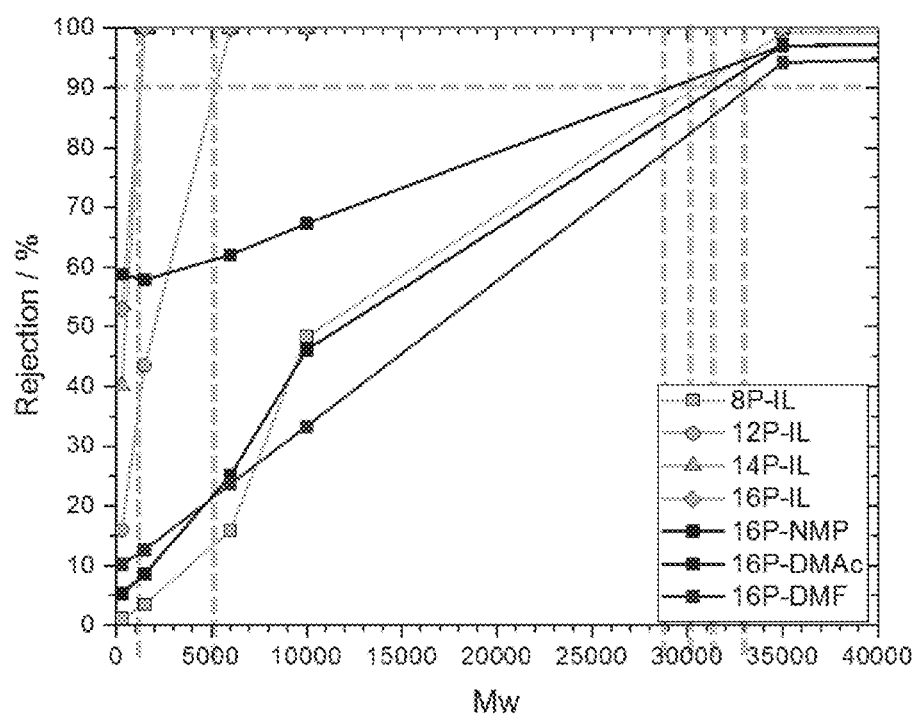
FIG. 18D is a graph showing molecular weight cut off (MWCO) of the membranes from [EMIM]DEP.

The membranes cast from PES/[EMIM]DEP solutions had nanosized pores. As shown in FIGS. 18B and 18D, the MWCO of membranes cast from 8, 12, 14, and 16 wt % PES solutions were 30, 5, 1.3, and 1.25 kg mol$^{-1}$, respectively. These values correspond to 5.2, 1.9, 0.9, and 0.88 mm solutes sizes respectively, as estimated using the Stokes radius equations 6 and 7. For comparison, membranes prepared from 16 wt % PES in NMP, DMAc and DMF were able to reject only larger solutes with the following sizes: 5.3, 5.1 and 5.5 nm. The pore size distribution estimated for different membranes is shown in FIG. 18C, confirming that membranes prepared under comparable conditions using [EMIM]DEP had smaller pore sizes than when using NMP, DMAc or DMF.

Figure 19A:
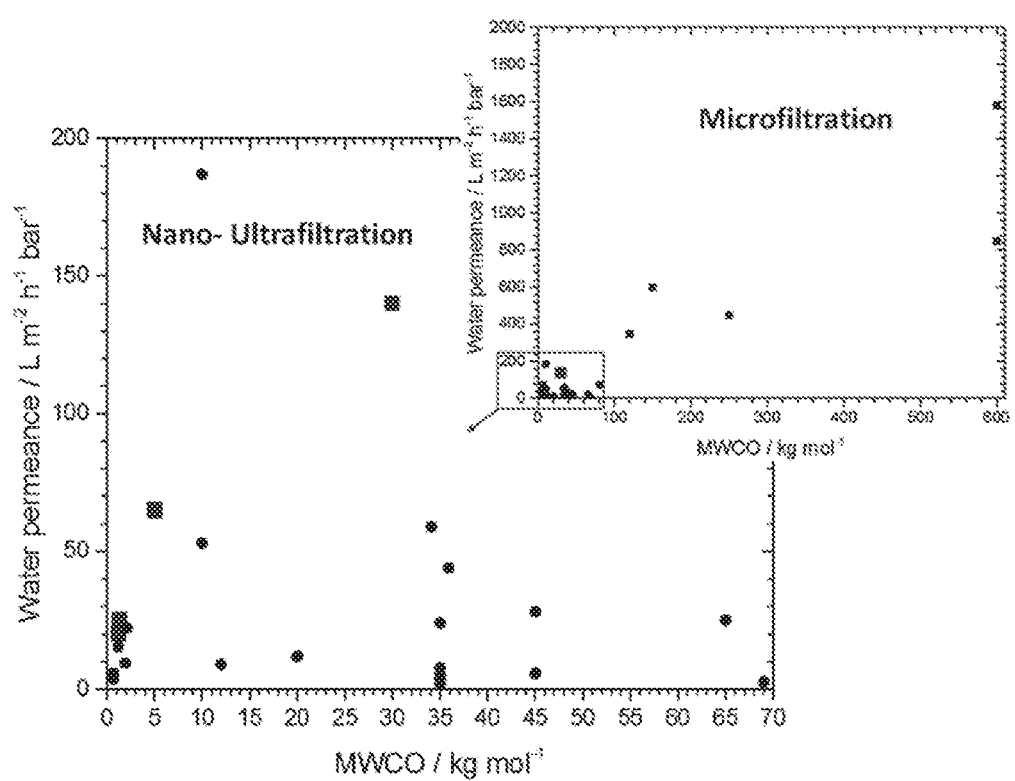
FIG. 19A is a graph showing MWCO-permeation trade-off plot of the membranes fabricated in this study (squares) and membranes previously reported in the literature (circles).

The MWCO's of the membranes prepared in this work were compared with PES membranes previously reported in the literature. (Z.-L. Xu and F. A. Qusay, Journal of Applied Polymer Science, 2004, 91, 3398-3407; K. Boussu, Polymer, 2006, 47, 3464-3476; A. Idris, Desalination, 2007, 207, 324-339; M. Irfan, Journal of Membrane Science, 2014, 467, 73-84) The MWCO-permeation trade-off plot is shown in FIG. 19A. The membranes prepared from PES/[EMIM] DEP solutions were able to reject smaller solutes (1,250 g mol$^{-1}$) than most other membranes, while keeping superior water permeance. As a whole, in the range of MWCO below 70 kg mol$^{-1}$, only one report showed data on permeance (187 L m$^{-2}$ h$^{-1}$ bar$^{-1}$) higher than the present case (for MWCO 10 kg mol$^{-1}$) (B. K. Chaturvedi, Desalination, 2001, 133, 31-40), Which resulted from optimization by non-solvent addition in the dope solution, using a short air gap.

Figure 19B:
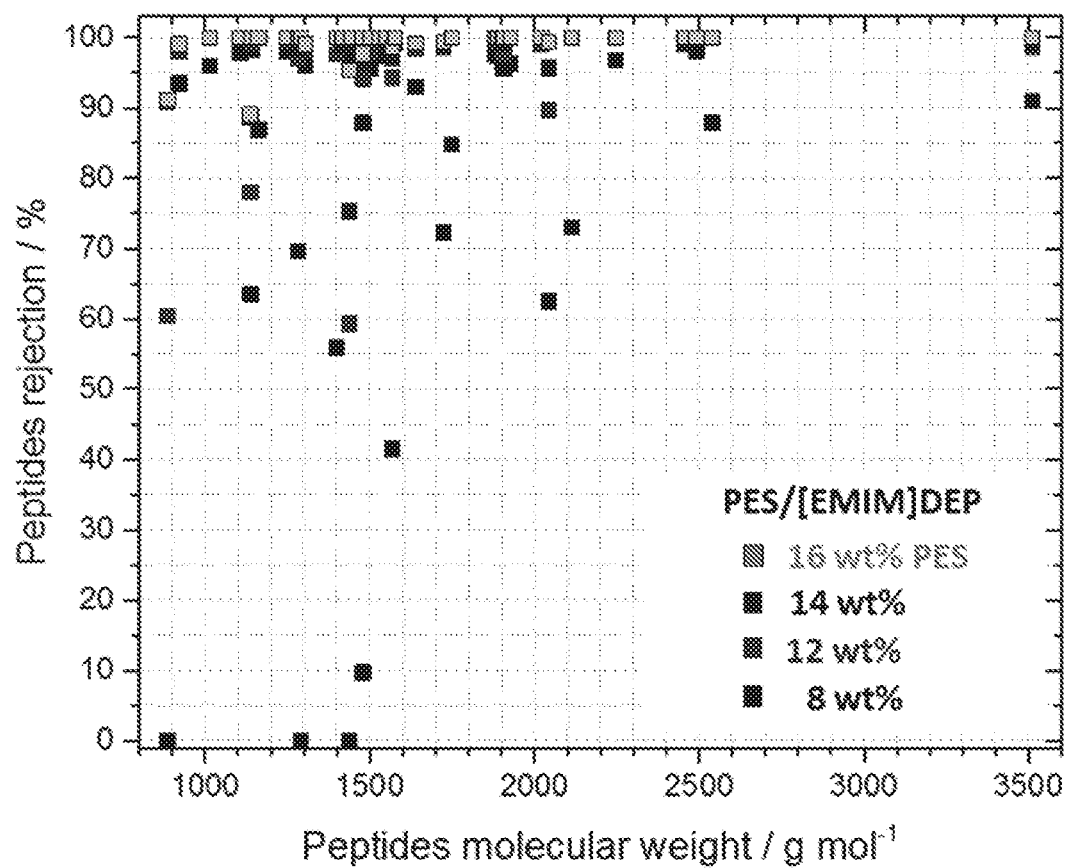
FIG. 19B is a graph showing BSA peptides rejection versus peptides molecular weight, measured with membranes cast from PES/[EMIM]DEP solutions with different polymer concentrations.

Peptides separation. The membranes cast from PES/[EMIM]DEP were applied in the separation of peptides with molecular weights ranging from 800 to 3,500 g mol$^{-1}$. After peptide analyses by proteomics, the rejections were calculated. The peptide rejection for each membrane can be found in FIG. 19B. All BSA peptides larger than 1,150 g mol$^{-1}$ were rejected more than 95% by the membrane cast from 16 wt % PES in [EMIM]DEP with MWCO 1,250 g mol$^{-1}$ (estimated with PEG). Peptides with molecular weight larger than 2000 g mol$^{-1}$ were rejected almost 100%. In the case of the membrane from 14 wt % PES, 95% rejection of peptides with molecular weight 1,450 g mol$^{-1}$ and 100% rejection of peptides with size over 2,050 g mol$^{-1}$ were measured. Membranes from 12 wt % and 8 wt % of PES had MWCO's of 5,000 and 30,000 g mol$^{-1}$, respectively, and were able to reject even peptides slightly smaller than their measured MWCO's. As a whole, their rejection of smaller peptides was lower than for membranes from 14 and 16 wt % PES. The membrane separation of charged solutes was likely affected by size exclusion and Donnan exclusion effects. In nanofiltration (NF) membranes, the size exclusion effect is however predominant; Donnan exclusion effects are predominant in the separation of peptides with ultrafiltration (UF) membranes (J. Timmer, M. Speelmans and H. Van Der Horst, Separation and Purification Technology, 1998, 14, 133-144). Membranes from 16 wt % and 14 wt % have MWCO's of 1,250 and 1,300 g mol$^{-1}$. Separation by size exclusion might be the preferential mechanism in this case. However, membranes from 12 wt % and 8 wt % solutions had pores in the range of ultrafiltration and, might be more affected by Dorman exclusion effects. This might be one of the reasons why some peptides, which are smaller than the pre-estimated MWCO, could be rejected.

Figure 20:
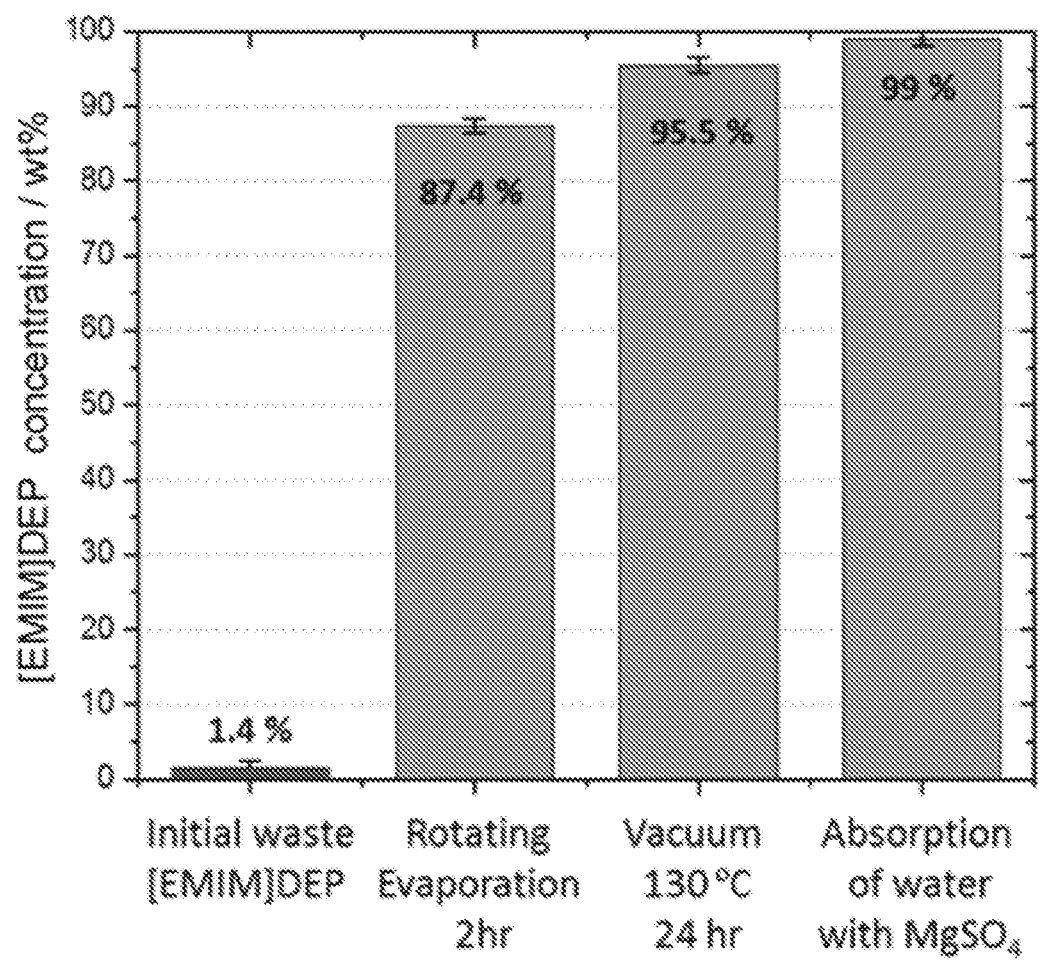
FIG. 20 is a graph showing the concentration of [EMIM]DEP at different steps of [EMIM]DEP recovery.

Recovery of [EMIM]DEP. The possibility of recovery of ionic liquid from the membrane fabrication bath was evaluated. The concentration of [EMIM]DEP in the all recovery steps is shown in FIG. 20. The starting concentration of [EMIM]DEP in the waste solution was of 1.4%. The solution was first concentrated by rotary evaporation, leading to the [EMIM]DEP concentration of 87.4%. The additions of vacuum and heat increased the concentration to 95.5%. MgSO$_4$ was used to absorb the remaining water, leading to a final concentration of 99.6%.

Example 4

Fabrication of Greener Polyetherimidesulfone (EXTEM™) Nanofiltration Membranes From Solutions in Ionic Liquids EXTEM™ (SABIC, Riyadh, Saudi Arabia) is a commercialized polymer which has mechanically and chemically stable properties. This polymer structurally composed of polyethermide and polysulfone groups. It has been used for membranes fabrication (J. Xia, et al., Industrial & Engineering Chemistry Research, 2010, 49. 12014-12021; N. Peng, et al., Journal of Membrane Science, 2010, 360, 48-57; T. A. Jalal, et al., Reactive and Functional Polymers, 2014, 85, 1-10). However, in these studies, common organic solvents: such as DMF; NMP; and DMAc were chosen for membrane manufacture as EXTEM™ itself is only soluble in solvents. However, it was determined that the chemically and thermally stable polymer, EXTEM™, can be dissolved in ionic liquids. Thus, in this study, the homogenously dissolved EXTEM™ polymer systems in the ionic liquids, [EMIM]SCN; [BMIM]SCN; and [EMIM]OAc, were investigated and were processed as membranes. However, EXTEM™ in [EMIM]SCN could be form as membranes.

Poly (ether imide sulfone), EXTEM™ XH1005 (average Mn=~88 kg mol$^{-1}$ measured by viscosity), was kindly provided by SABIC (Riyadh, Saudi Arabia). 1-ethyl-3-methylimidazolium thiocyanate ([EMIM]SCN, ≥95.0%), 1-buthyl-3-methylimidazolium thiocyanate ([BMIM]SCN, ≥95.0%), and N-dimethylformamide (DMF, ≥99.0%) were purchased by Sigma-Aldrich (St. Louis, Mo.) as chemicals for membrane fabrication. The structure of the polymer and all ionic liquids are shown in FIGS. 21A, 21B, 21C and 21D. Polyethylene glycol (PEG) (Sigma-Aldrich) and polyethyleneoxide (PEO) (Sigma-Aldrich), with the molecular weights of 300; 1500; 6000; 10000; and 35000 g mol$^{-1}$, were used for the solute rejection evaluation and determination of the molecular weight cut-off (MWCO). Deoxyribonucleic acid (DNA, 3229 and 6441 g mol$^{-1}$ composed of adenine and guanine); Bovine serum albumin (BSA, ~66 kg mol$^{-1}$), γ-globulin (~140 kg mol$^{-1}$), and which were supplied from Sigma-Aldrich (St. Louis, Mo.), were used for testing the filtration capacity of all membranes.

Polymer solution thermodynamics were determined as described in Example 3.

The difference of the total solubility parameters indicated compatibility of EXTEM™ and solvents. Table 4 shows the solubility parameters of all components used in this study and their differences. The differences between EXTEM™ and all solvents, $|\delta_{EXTEM™}-\delta_{DMF}|$; $|\delta_{EXTEM™}-\delta_{[BMIM]SCN}|$; $|\delta_{EXTEM™}-\delta_{[EMIM]OAc}|$; and $|\delta_{EXTEM™}-\delta_{[EMIM]SCN}|$, are 1.1; 2.9; 6.1; and 7.5, respectively, denoting that the order of better solubility with EXTEM™ is the solvents of DMF>[BMIM]SCN>[EMIM]OAc>[EMIM]SCN.

TABLE 4

Solubility parameters of the polymer and solvents used in this study.

| | $\delta_D$ | $\delta_P$ | $\delta_H$ | $\delta$ (MPa$^{1/2}$) |
|---|---|---|---|---|
| EXTEM ™[a] | 21 | 10.9 | 10.6 | 26 |
| [EMIM]SCN[a] | 22.7 | 19.1 | 15.6 | 33.5 |
| [BMIM]SCN[a] | 19.5 | 17.1 | 12.6 | 28.9 |
| [EMIM]OAc[a] | 22.2 | 15.9 | 16.9 | 32.1 |
| DMF[b] | 17.4 | 13.7 | 11.3 | 24.9 |
| Water[b] | 15.5 | 16 | 42.3 | 47.8 |

[a]Calculated from HSPiP
[b]From Hansen, C.M. Hansen solubility parameters: A user's handbook. CRC Press LLC: N.W., Boca Raton, USA, 2000.

Figure 23:
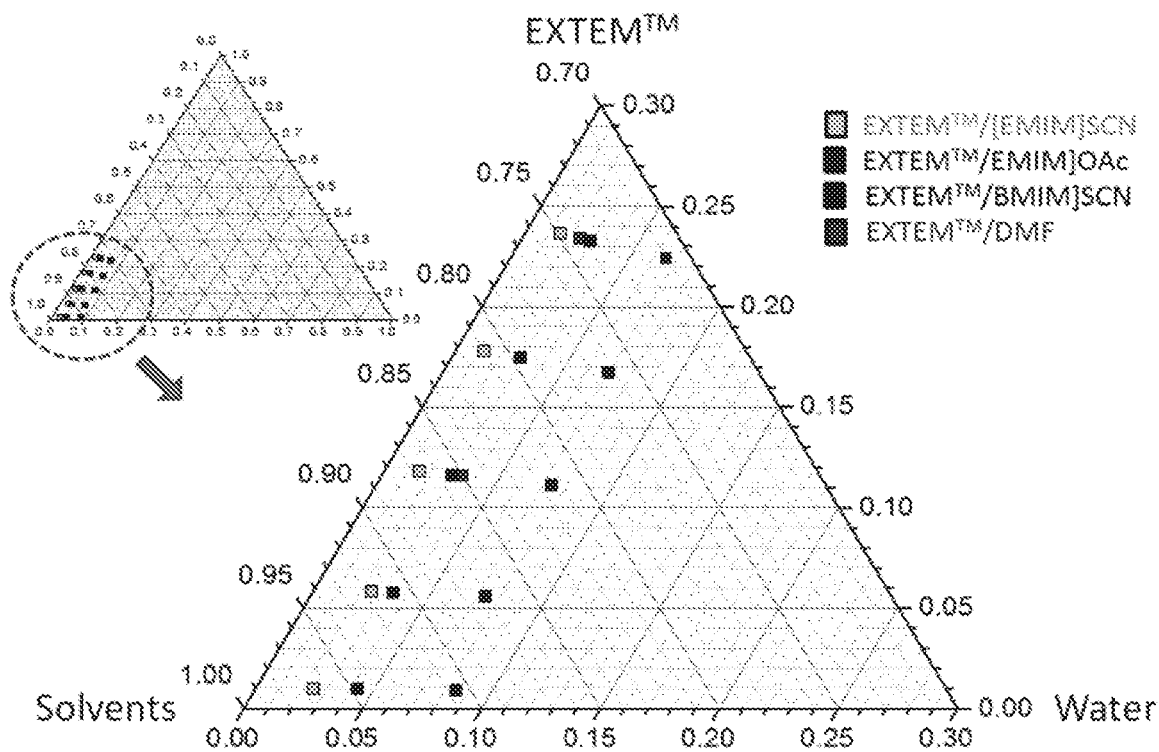
FIG. 23 is a phase diagram of EXTEM™ solutions using water as a non-solvent at room temperature.

Gibbs free energy of mixing (ΔG), which was estimated from Flory-Huggins parameter and the solubility parameters, is illustrated in FIGS. 22A and 22B. The Gibbs free energy of mixing ($\Delta G_m$) is an informative parameter to predict the miscibility of a polymer/solvent mixture (D. Kim, N. Moreno and S. P. Nunes, Polymer Chemistry, 2016, 7, 113-124). If $\Delta G_m$ is negative, the polymer is expected to be completely dissolved in the solvent. In contrast, if $\Delta G_m$ is significantly higher than zero, the mixture is unlikely to be homogenous. $\Delta G_m$ of the polymer solutions in the system of EXTEM™/[BMIM]SCN and EXTEM™/DMF was negative, indicating that EXTEM™ were homogenously miscible in those solvents of DMF and [BMIM]SCN. On the other hand, $\Delta G_m$ of the polymer solutions in the system of EXTEM™/[EMIM]SCN and EXTEM™/[BMIM]SCN were slightly positive, however, the values were close to Zero. Thus, the interaction between EXTEM™ and those solvents was weak but, it is dissolved in [EMIM]SCN and [BMIM]SCN. The $\Delta G_m$ estimation in the case of ionic liquids was a relatively rough approximation since additional strong coulombic interactions were not taken into account and ionic liquids were more complex systems than ordinary organic solvents. However, the relative values shown in FIGS. 22A and 22B are a good indication of the quality of different solvents for EXTEM™ Phase Diagram. Phase diagram of a polymer/solvent/non-solvent system was estimated through cloud point tests. A series of EXTEM™ solutions were prepared in different compositions and concentrations. Their cloud points were determined by adding water as a non-solvent at room temperature until turbidity was observed. The amounts of EXTEM™, solvents, and water for each cloud point were plotted in a ternary diagram. See FIG. 23.

The phase diagrams for different EXTEM™/solvent/water systems were obtained by measuring their cloud points. The 2-phase region of the diagram increased in the following order: EXTEM™/[EMIM]OAc<EXTEM™/[BMIM]SCN≈EXTEM™/DMF<EXTEM™/[EMIM]SCN.

Figure 24:
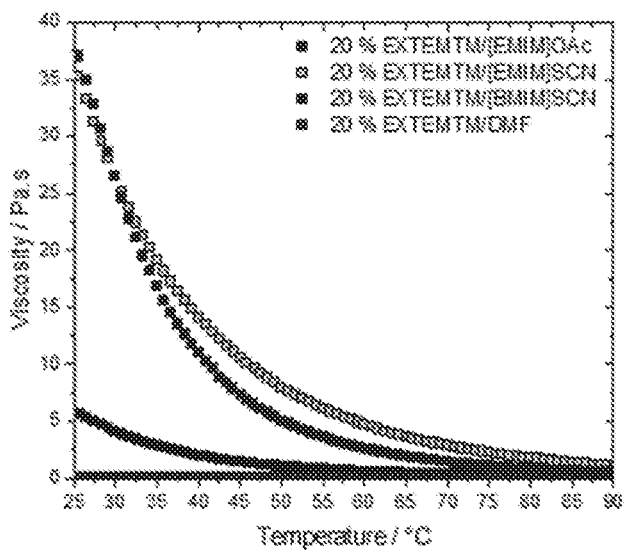
FIG. 24 is a graph showing the results of the viscosity at the shear rate of 10 $s^{-1}$ as a function of temperature.

Viscosity. The order of Viscosity was EXTEM™/[EMIM]SCN>EXTEM™/[EMIM]OAc>EXTEM™/[BMIM]SCN>EXTEM™/DMF. As increasing the polymer concentration up to 20 wt %, EXTEM™/[EMIM]SCN, which has weaker interaction, may have caused more friction in the polymer coil, to result in higher viscosity. See FIG. 24.

Membrane characterization. All solutions were cast on non-woven supports with the thickness of 250 µm and with the controlled temperature of 70° C. The cast solutions were immersed in deionized water for phase inversion and kept in water for a day to eliminate any residual solvent.

Figure 25:
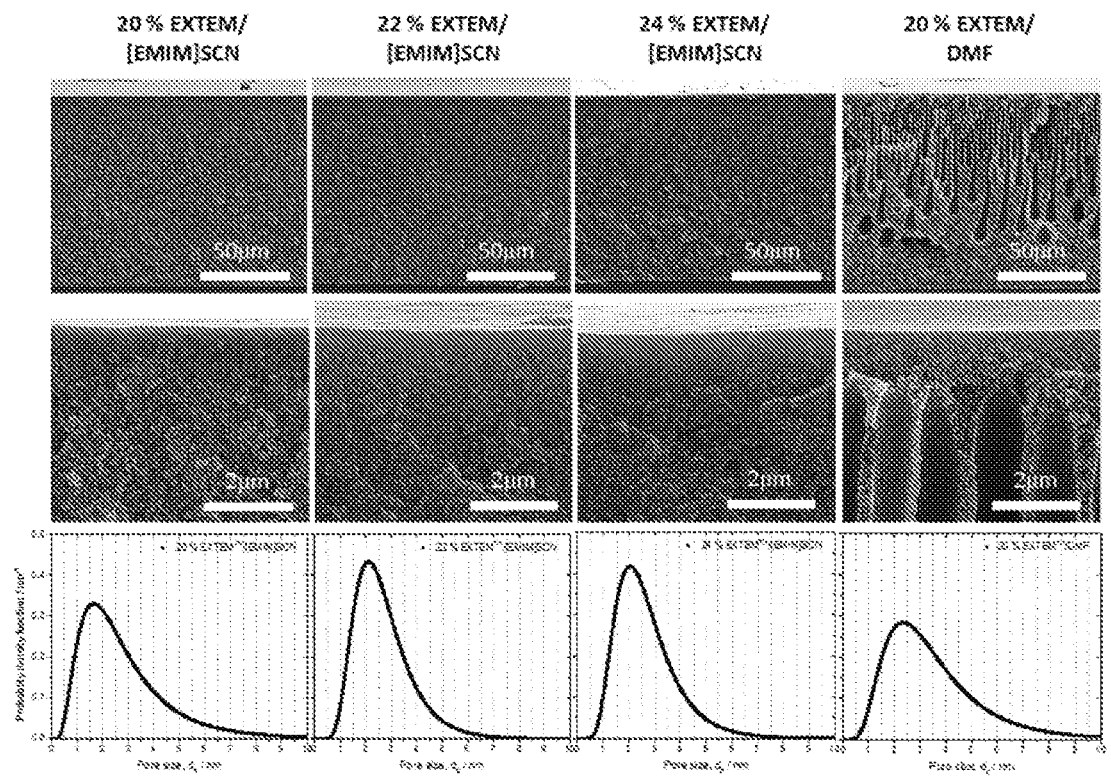
FIG. 25 are images of the cross-sectional morphologies and graphs of the pore distributions of 20 wt % EXTEM™/[EMIM]SCN; 22 wt % EXTEM™/[EMIM]SCN; 24 wt % EXTEM™/[EMIM]SCN; and 20 wt % EXTEM™/DMF.

The EXTEM™ membranes in [EMIM]SCN have sponge-like structure with fine pores. Finger-like cavities, however, were found in the membranes in DMF. The mean pore size of the membranes prepared from 20% EXTEM™/[EMIM]SCN was smaller (approximately 1.5 nm) than that of 20% EXTEM™/DMF. Membranes prepared from EXTEM™ solutions in [EMIM]SCN with even higher concentrations had narrower pore size distribution. The mean pore size was in the nanometer range in all cases. Although EXTEM™ was also soluble in other ionic liquids, [EMIM]OAc and [BMIM]SCN, membranes prepared by phase inversion of these solutions in water were very brittle. They were not further characterized in terms of pore size, separation performance and permeance. See FIG. 25.

Figure 26:
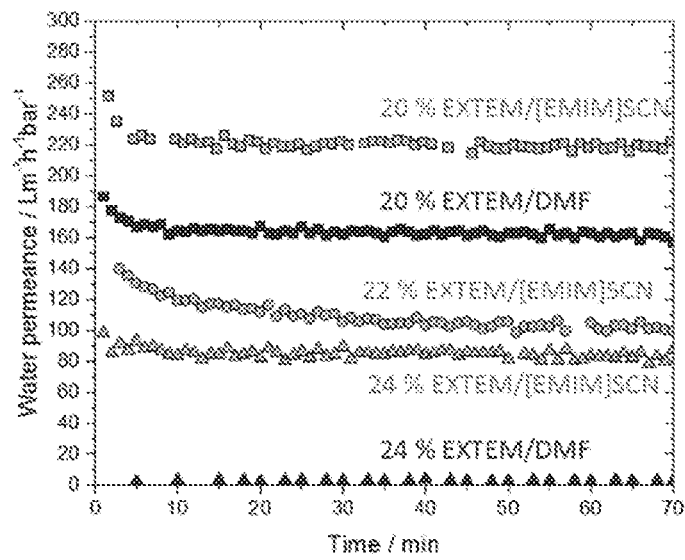
FIG. 26 is a graph showing the water permeance in 20 wt % EXTEM™/[EMIM]SCN; 22 wt % EXTEM™/[EMIM]SCN; 24 wt % EXTEM™/[EMIM]SCN; 20 wt % EXTEM™/DMF; and 24 wt % EXTEM™/DMF membranes.

Pure water permeance. All membranes prepared from solution in [EMIM]SCN had very high water permeance for the similar range of pore size as shown in FIG. 26 and Table 5. In particular, the membranes from 20% EXTEM™ in [EMIM]SCN had a permeance of 230 L m$^{-2}$ h$^{-1}$ bar$^{-1}$ which is 60 L m$^{-2}$ h$^{-1}$ bar$^{-1}$ higher than that of the membrane prepared from 20% EXTEM™ in DMF.

TABLE 5

Pure water permeance, MWCO and protein separation of EXTEMTM membranes

| Membranes | Pure water permeance (L m$^{-2}$ h$^{-1}$ bar$^{-1}$) | MWCO (kg mol$^{-1}$) |
|---|---|---|
| 20% EXTEMTM/[EMIM]SCN | 230 ± 20 | 7.3 |
| 22% EXTEMTM/[EMIM]SCN | 120 ± 20 | 5.2 |
| 24% EXTEMTM/[EMIM]SCN | 90 ± 10 | 5.3 |
| 20% EXTEMTM/DMF | 170 ± 15 | 9.7 |
| 24% EXTEMTM/DMF | 3 ± 2 | 5.3 |

Figure 27:
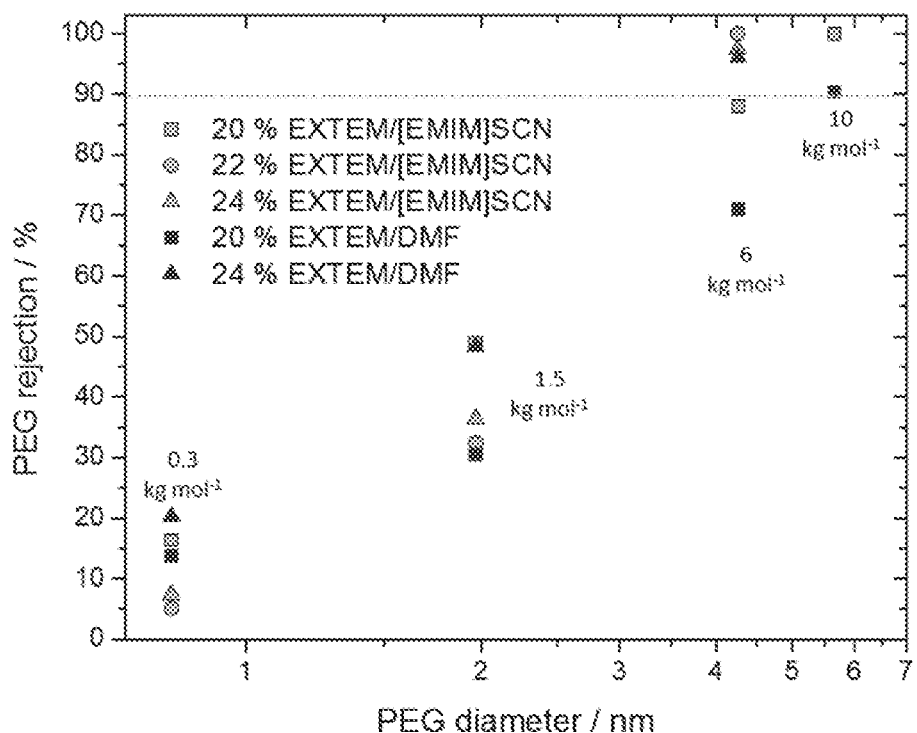
FIG. 27 is a graph showing PEG solute rejection in 20 wt % EXTEM™/[EMIM]SCN; 22 wt % EXTEM™/[EMIM]SCN; 24 wt % EXTEM™/[EMIM]SCN; 20 wt % EXTEM™/DMF; and 24 wt % EXTEM™/DMF membranes.

PEG Rejection. FIG. 27 shows PEG rejection of different membranes. The MWCOs of the membranes, prepared from 20%; 22%; and 24% EXTEM™ solutions in [EMIM]SCN, were 7300, 5200, and 5300 g mol$^{-1}$, respectively. Membranes prepared from solutions in DMF with similar concentration have larger pore size and lower rejection.

DNA and Protein Separation. Rejection of all membranes were examined by filtration of DNA, BSA, and γ-globulin solutions (1 g/mL) through the membranes using a dead-end UF set-up (Amicon® Stirred Cells, EMD Millipore (Billerica, Mass.)). The feed solutions for BSA, and γ-globulin were prepared in the phosphate buffered saline solution (20 mM). Primary DNA designed their molecular weights of 3220 and 6440 g mol$^{-1}$ were dissolved in water to obtain the DNA feed solutions. The concentration of proteins and DNA was analyzed by a UV spectrometer at 280 nm to calculate their rejection.

All membranes rejected more than 97% of BSA and 99% of γ-globulin. The membrane, 22% EXTEM™/[EMIM]SCN, rejected 84 and 94% of DNA (3.4 and 6.4 kg mol$^{-1}$), respectively. In case of the 24% EXTEM™/[EMIM]SCN membrane, DNA was rejected approximately 93% in both molecular weight of 3.4 and 6.4 kg mol$^{-1}$. See Table 6.

TABLE 6

Percent Rejection

| Membranes | Rejection (%) | | | |
|---|---|---|---|---|
| | DNA Mn = 3.4 kg mol$^{-1}$ | DNA Mn = 6.4 kg mol$^{-1}$ | BSA Mn = ~69 kg mol$^{-1}$ | γ-Globulin Mn = ~140 kg mol$^{-1}$ |
| 20% EXTEM ™/[EMIM]SCN | — | — | 97.7 | 99.4 |
| 22% EXTEM ™/[EMIM]SCN | 84.4 | 94.1 | 98.3 | 99.7 |
| 24% EXTEM ™/[EMIM]SCN | 92.7 | 93.1 | 98.1 | 99.2 |
| 20% EXTEM ™/DMF | — | — | 99.7 | 99.4 |
| 24% EXTEM ™/DMF | — | — | 99.7 | 99.4 |

Figure 28:
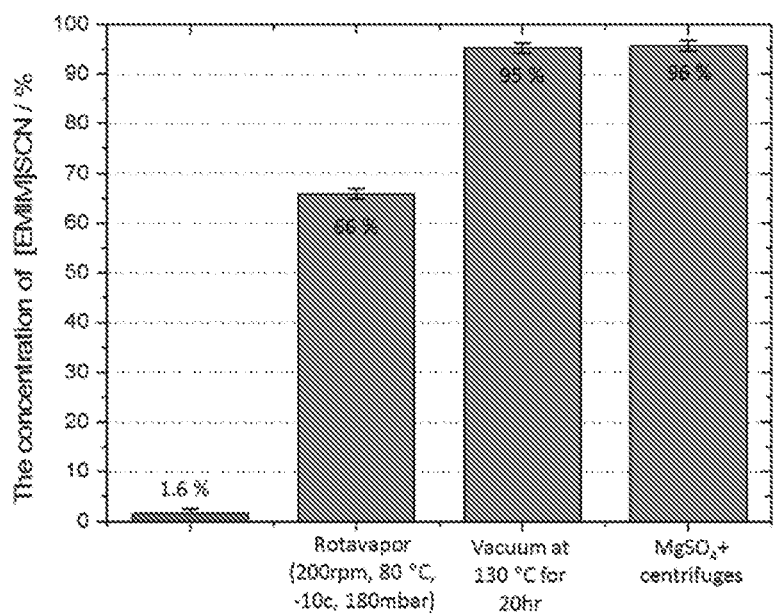
FIG. 28 is a graph showing the ionic liquid [EMIM]SCN can be recovered for reuse.

Ionic liquid recovery. The phase inversion bath had 500 ml water. After the membrane preparation, the concentration of [EMIM]SCN in the bath was 1.6%. Through 3 steps of recovery, the final ionic liquid concentration could be increased to 96%. The purity of the ionic liquid for casting solution preparation was ≥95%. Therefore, it can be fully recovered for reuse. See FIG. 28.

What is claimed is:

1. A method of making a membrane comprising:
preparing a membrane solution by dissolving a polymer in a solvent consisting of an ionic liquid, wherein the polymer is selected from the group consisting of polyvinylidene fluoride-hexafluoropropyl copolymer (PVDFHFP), polyvinylidene fluoride (PVDF), polyvinylfluoride (PVF), polychlorotrifluoroethylene (PCTFE), perfluoroalkoxy polymer (PFA), fluorinated ethylene-propylene (FEP), polyethylenetetrafluoroethylene (ETFE), polyethylenechlorotrifluoroethylene (ECTFE), perfluorinated elastomer [perfluoroelastomer] (FFPM/FFKM), fluorocarbon [chlorotrifluoroethylenevinylidene fluoride] (FPM/FKM), fluoroelastomer [tetrafluoroethylene-propylene] (FEPM), perfluoropolyether (PFPE), perfluorosulfonic acid (PFSA), perfluoropolyoxetane, polyterafluoroethylene (PTFE), polysulfone, polyether sulfone (PES), polyetherimide, polyetherimide sulfone, polycarbonate, polyphenylene sulfide, polystyrene, aromatic polycarbonates, aromatic polyesters, aromatic polyphenylenes, polyxylylenes, polyphenylenevinylenes, polyphenyleneethylenes, and polyaryl ether ketones, or a combination thereof;

wherein the ionic liquid is selected from the group consisting of 1-ethyl-3-methylimidazolium diethyl phosphate ([EMIM]DEP), 1-ethyl-3-methylimidazolium thiocyanate ([EMIM]SCN), 1-butyl-3-methylimidazolium chloride, 1-alkyl-3-methylimidazolium, 1-alkylpyridinium, 1-alkylpyridinium chloride, and N-methyl-N-alkylpyrrolidinium;

casting or spinning the membrane solution; and inducing phase separation by immersing the cast or spun membrane solution in a membrane fabrication bath comprising a poor solvent or a non-solvent, thereby forming the membrane.

2. The method of claim 1, wherein the poor solvent or non-solvent is selected from the group consisting of glycerin, ethylene glycol, butanediol, propylene glycol, methanol, ethanol, butanol, isopropanol, and water or a combination thereof.

3. The method of claim 1, wherein the polymer is selected from a combination of one or more of: PVDFHFP, PVDF, PVF, PCTFE, PFA, FEP, ETFE, ECTFE, FFPM/FFKM, FPM/FKM, FEPM, PFPE, PFSA, perfluoropolyoxetane, and PTFE with one or more of polysulfone, PES, polyetherimide, and polyetherimide sulfone.

4. The method of claim 1, wherein the membrane solution comprises 0.1 to 30 weight percent of the polymer.

5. The method of claim 4, wherein the membrane solution comprises 10 to 20 weight percent of the polymer.

6. The method of claim 1, wherein the membrane solution comprises 70 to 99 weight percent of the solvent.

7. The method of claim 1, wherein the membrane solution further comprises one or more additives selected from the group consisting of metal compounds, inorganic acids, and organic acids.

8. The method of claim 1, wherein the polymer is PVDFHFP, PVDF, PVF, PCTFE, PFA, FEP, ETFE, ECTFE, FFPM/FFKM, FPM/FKM, FEPM, PFPE, PFSA, perfluoropolyoxetane, or PTFE.

9. The method of claim 1, wherein the polymer is polyetherimide sulfone.

10. The method of claim 1, wherein the polymer is polyetherimide, PES, or PVDF.

11. The method of claim 10, wherein the polymer is PES.

12. The method of claim 9, wherein the ionic liquid is [EMIM] SCN.

13. The method of claim 10, wherein the ionic liquid is [EMIM] DEP.

14. The method of claim 1, further comprising recovering the ionic liquid from the membrane fabrication bath after the membrane has been formed.

15. The method of claim 14, wherein the membrane fabrication bath consists of water, and recovering the ionic liquid comprises evaporation or adsorbing the water to concentrate the ionic liquid.

* * * * *